(12) United States Patent
Nonomiya et al.

(10) Patent No.: US 9,010,854 B2
(45) Date of Patent: Apr. 21, 2015

(54) FRAME STRUCTURE OF SEAT CUSHION FOR VEHICLE SEAT AND VEHICLE SEAT WITH SAID FRAME STRUCTURE

(75) Inventors: Masaaki Nonomiya, Yokohama (JP); Hiroshi Kushiku, Yokohama (JP)

(73) Assignee: NHK Spring Co., Ltd., Yokohama-shi (JP)

( * ) Notice: Subject to any disclaimer, the term of this patent is extended or adjusted under 35 U.S.C. 154(b) by 358 days.

(21) Appl. No.: 13/470,794

(22) Filed: May 14, 2012

(65) Prior Publication Data
US 2012/0313415 A1 Dec. 13, 2012

(30) Foreign Application Priority Data

May 13, 2011 (JP) .................................. 2011-108828

(51) Int. Cl.
*B60N 2/427* (2006.01)
*B60N 2/42* (2006.01)
*B60N 2/68* (2006.01)

(52) U.S. Cl.
CPC ................ *B60N 2/4228* (2013.01); *B60N 2/68* (2013.01); *B60N 2/4221* (2013.01); *B60N 2/42709* (2013.01); *B60N 2/42745* (2013.01)

(58) Field of Classification Search
CPC .................................................. B60B 2/4228
USPC ........................................... 297/216.1, 216.14
See application file for complete search history.

(56) References Cited

U.S. PATENT DOCUMENTS

| 2,735,476 | A | * | 2/1956 | Fieber ...................... 297/216.19 |
| 3,957,304 | A | * | 5/1976 | Koutsky et al. ............ 297/216.1 |
| 5,295,729 | A | * | 3/1994 | Viano ...................... 297/216.14 |
| 7,303,229 | B2 | * | 12/2007 | Fujita et al. ............ 297/216.1 X |
| 8,113,575 | B2 | * | 2/2012 | Masutani .................... 297/216.1 |
| 8,414,077 | B2 | * | 4/2013 | Reubeuze et al. ..... 297/367 P X |

* cited by examiner

*Primary Examiner* — Anthony D Barfield
(74) *Attorney, Agent, or Firm* — Flynn, Thiel, Boutell & Tanis, P.C.

(57) ABSTRACT

A seat cushion frame structure of a seat for a vehicle has an oblique monolithic strip on at least one of a pair of side frames an upper end of which is fixed to a side portion of the at least one of pair of side frames and a lower end of which is fixed to the seat cushion frame structure at a position forward of the upper end. The oblique monolithic strip is arranged in such a way that one of its strip surfaces opposed to each other is oriented to be upward, its cross section perpendicular to the opposed strip surfaces is a rectangle long in a lateral direction and includes at each of its upper and lower ends a wound portion which is wound in a loop manner in such a way that the one of said opposed strip surfaces is oriented to be inward.

17 Claims, 23 Drawing Sheets

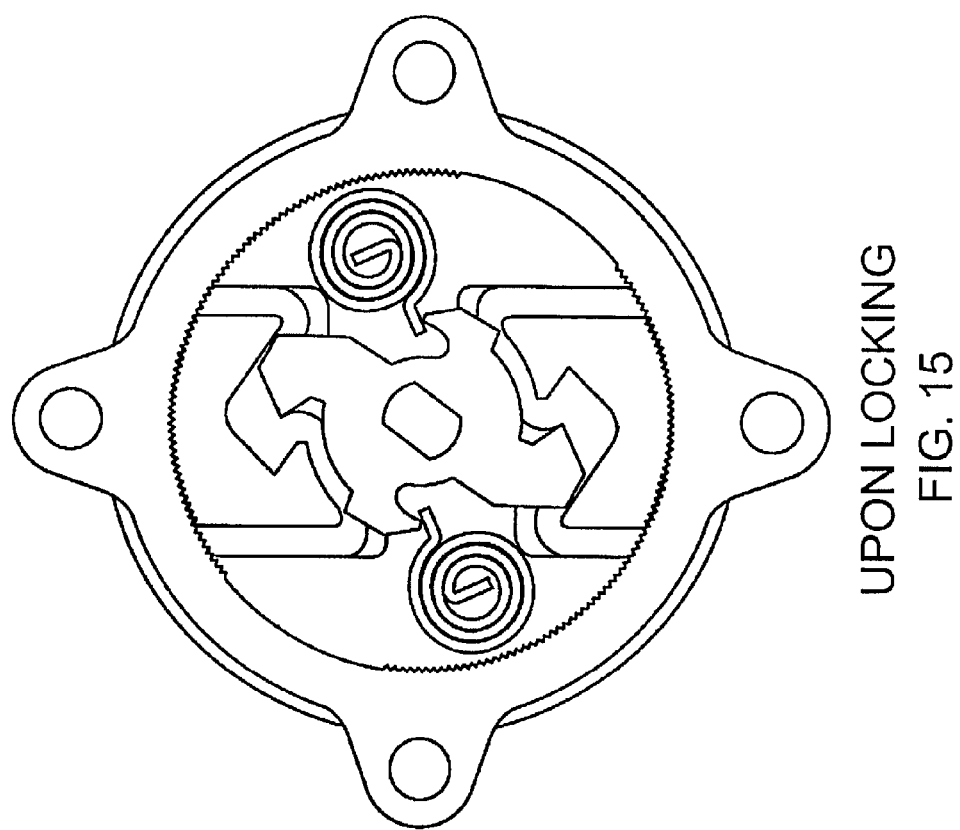

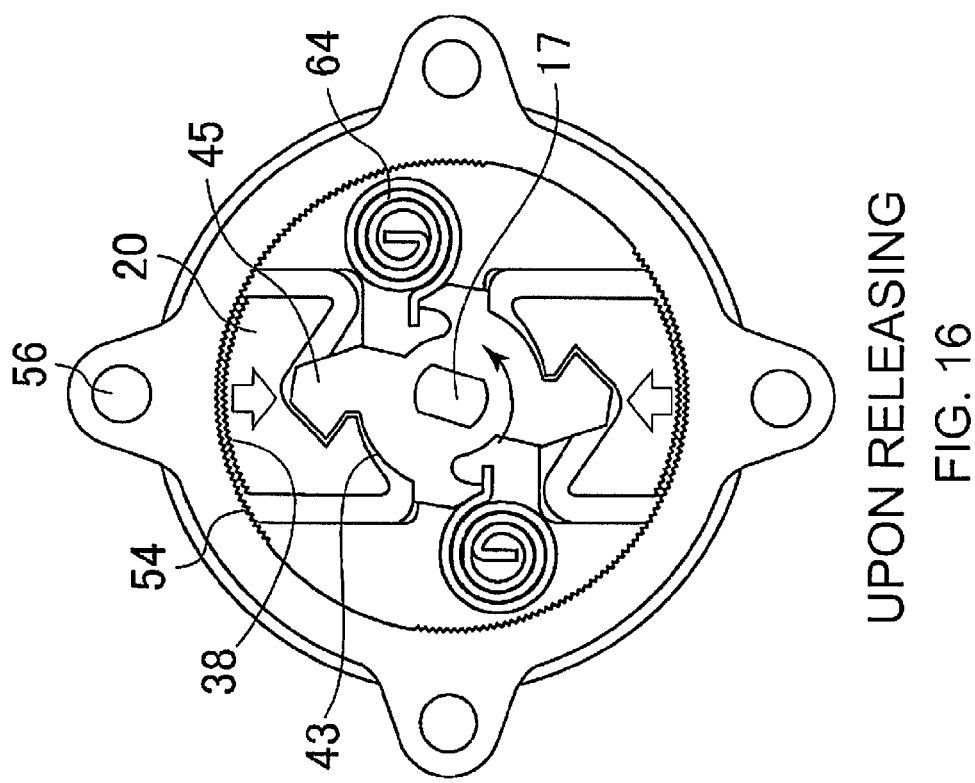

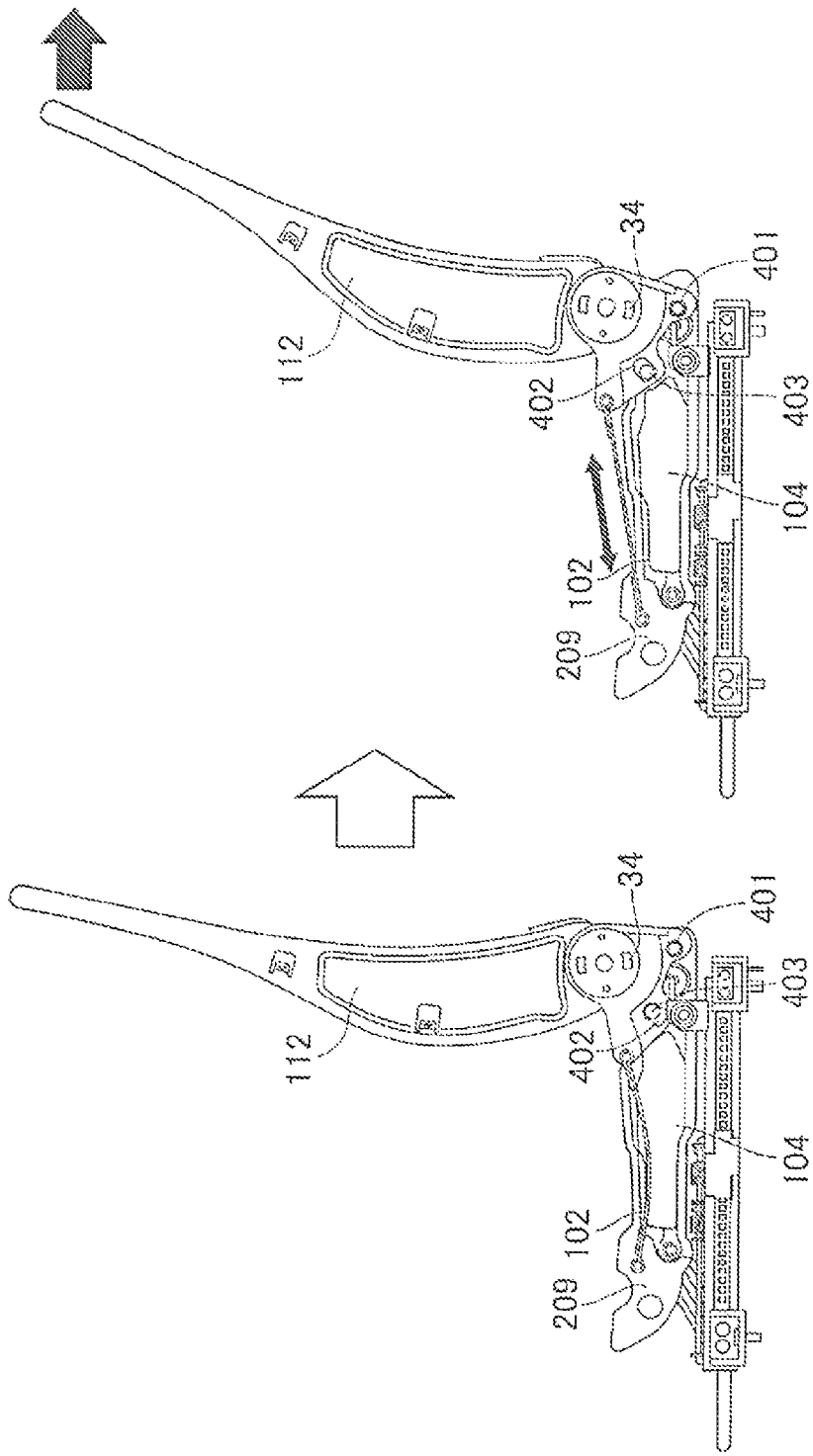

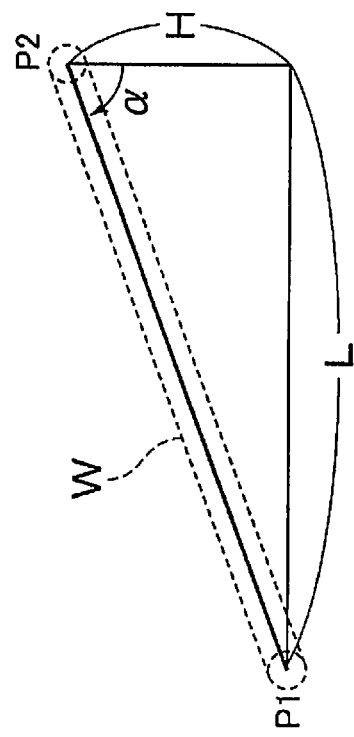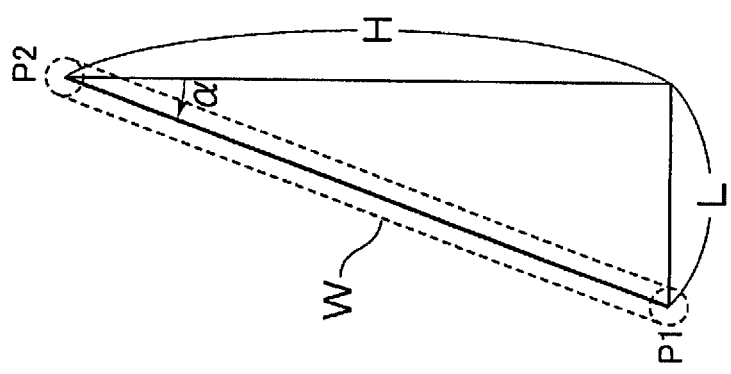
FIG. 23A
FIG. 23B

FRAME STRUCTURE OF SEAT CUSHION FOR VEHICLE SEAT AND VEHICLE SEAT WITH SAID FRAME STRUCTURE

FIELD OF THE INVENTION

The present invention relates to a seat cushion frame structure of a Seat for a vehicle and a seat for a vehicle with said seat cushion frame structure, and, in particular, relates to such a seat cushion frame structure of a seat for a vehicle and a seat for a vehicle with said seat cushion frame structure which are capable of decreasing the cost and weight of a seat, while at the same time securing a necessary strength or rigidity.

BACKGROUND OF THE INVENTION

The present applicant proposed by the patent publication 1 (Japanese Patent Laid-open publication 2010-94436) and the patent publication 2 (Japanese Patent Laid-open publication 2010-94441) a seat back frame structure of a seat for a vehicle with an oblique wire and a seat cushion frame structure of a seat for a vehicle with an oblique wire, respectively, in order to secure a necessary strength or rigidity upon the collision of the vehicle, while at the same time reducing the weight and the cost of the seat.

According to the patent publication 1, the seat back frame structure of a seat for a vehicle comprises a seat back frame structure, a lower end of which is connected to a rear end of a seat cushion frame structure in such a way that the seat back frame structure can be inclined relative to the seat cushion frame structure, said seat back frame structure includes a pair of side frames, each of which extends in a vertical direction of the vehicle, and an oblique wire on at least one of said pair of side frames, an upper end of which is fixed to a side portion of said at least one of the pair of side frames and a lower and of which is fixed to said seat back frame structure at a position forward of a rotational center of said seat back frame structure, said oblique wire includes a characteristic such that, in a case where a load toward a rear side of the vehicle is loaded on said seat back frame structure, it has a tension force exerted on said seat back frame structure so as to alleviate a moment acting on said seat back frame structure caused by said load, while it does not resist a compressive force from outside thereof.

According to the seat back frame structure of a seat for a vehicle, a sectional shape of at least one of a pair of side frames can be determined so as to set a section modulus of at least one of the pair of side frames in such a way that at least one of the pair of side frames can withstand a bending moment caused by an impact load loaded toward the front side of the vehicle, and in a case where an impact load larger than the impact load loaded toward the front side of the vehicle is loaded toward the rear side of the vehicle, it is possible to cause an oblique wire to share a difference between said impact load toward the front side of the vehicle and that toward the rear side of the vehicle by positioning the oblique wire so as to cause a tension force from the oblique wire to be exerted on the seat back frame structure in such a way that said bending moment acting on the seat back frame structure based on said impact load toward the rear side of the vehicle can be alleviated, and as a result, since it becomes unnecessary to set a sectional shape of the pair of side frames so as to withstand the impact load toward the rear side of the vehicle, a necessary strength or rigidity of the pair of side frames can be secured, while at the same time the weight of the pair of side frames can be decreased by means of the oblique wire.

On the other hand, according to the patent publication 2, the seat cushion frame structure of a seat for a vehicle comprises a seat cushion frame structure, a rear end of which is connected to a lower end of a seat back frame structure in such a way that the seat back frame structure can be inclined relative to the seat cushion frame structure, said seat cushion frame structure includes a pair of side frames, each of which extends in a longitudinal direction of the vehicle, and an oblique wire on at least one of said pair of side frames, an upper end of which is fixed to a side portion of said at least one of pair of side frames and a lower end of which is fixed to said seat cushion frame structure at a position forward of said upper end, said oblique wire includes a characteristic such that, in a case where a load toward a rear side of the vehicle is loaded on said seat cushion frame structure, it has a tension force exerted on said seat cushion frame structure so as to alleviate a moment acting on said seat cushion frame structure caused by said load, while it does not resist a compressive force from outside thereof.

According to the seat cushion frame structure of a seat for a vehicle, a sectional shape of at least one of a pair of side frames can be determined so as to set a section modulus of at least one of the pair of side frames in such a way that at least one of the pair of side frames can withstand a bending moment caused by the impact load loaded toward the front side of the vehicle, and in a case where an impact load is larger than the impact load loaded toward the front side of the vehicle is loaded toward the rear side of the vehicle, when such an impact load is transmitted to the seat cushion frame structure through a connection portion between the seat cushion and the seat back, it is possible to cause an oblique wire to share a difference between said impact load toward the front side of the vehicle and that toward the rear side of the vehicle by positioning the oblique wire so as to cause a tension force from the oblique wire to be exerted on the seat cushion frame structure in such a way that said bending moment acting on the seat cushion frame structure based on said impact load toward the rear side of the vehicle can be alleviated, and as a result, since it becomes unnecessary to set a sectional shape of the pair of side frames so as to withstand the impact load toward the rear side of the vehicle, a necessary strength or rigidity of the pair of side frames can be secured, while at the same time the weight of the pair of side frames can be decreased by means of the oblique wire.

However, the present applicant found out the following technical problems caused by the adoption of such an oblique wire.

Firstly, in such an oblique wire, its apparent tension rigidity can be decreased upon the collision of the vehicle, and the cost for the material and manufacturing of it is rather high.

More specifically, the conventional oblique wire includes an expensive wire formed by bundling a plurality of helical stranded lines and a separate ring portion fixed on each end of the wire by the caulking, so that it is fixed on a seat frame structure through the respective ring portions. In such a case, a slippage between the adjacent stranded lines can be caused when a tension force is generated on the oblique wire due to the fact that the stranded lines are caused to be straightened under the wire structure in which the plurality of stranded lines are bundled, while at the same time, a slippage can be also caused at the caulking portions of the ring portions fixed on the upper and lower ends of the oblique wire during the caulking process, whereby an apparent tension rigidity of the oblique wire is decreased.

Secondly, even if such an oblique wire is adopted with respect to the seat back frame structure, as compared with a case where it is adopted with respect to the seat cushion frame structure, it is technically difficult for the oblique wire to effectively bear the impact load.

More specifically, as shown in FIG. 23, the larger an inclination angle α of the oblique wire becomes, the bigger a rate of a component resisting the impact load becomes, so that the provision of the oblique wire is effective. However, as compared with the seat cushion frame structure, in the seat back frame structure, it is difficult to increase the inclination angle α due to the seat frame structure, so that the above effectiveness is reduced.

Further, as shown in FIG. 23, in the back frame structure (FIG. 23(A)), the oblique wire W is provided on the side portion of the side frame of the seat back frame structure. In this case, it is evident that the height H of the upper end P2 of the oblique wire at the rear side of the vehicle is bigger than the horizontal protruding distance L of the lower end P1 of the oblique wire W at the front side of the vehicle from the opposed side frames, so that the inclination angle α inevitably becomes smaller than 45 degrees. On the other hand, in the cushion frame structure (FIG. 23(B)), the oblique wire W is also provided on the side portion of the side frame of the seat cushion frame structure. In this case, it is evident that the horizontal protruding distance L of the lower end P1 of the oblique wire W at the front side of the vehicle is bigger than the vertical protruding distance L of the upper end P2 of the oblique wire W at the rear side of the vehicle from the opposed side frames, so that the inclination angle α inevitably becomes larger than 45 degrees, contrary to the case of the seat back frame structure, and thus, it is difficult to make the horizontal protruding distance L long in the seat back frame structure, mainly because the aesthetic appearance of the seat back can deteriorate if the horizontal protruding distance L is made long.

SUMMARY OF THE INVENTION

In view of the above technical problems, an object of the present invention is to provide a seat cushion frame structure of a seat for a vehicle and a seat for a vehicle with such a seat cushion frame structure which are capable of securing a necessary strength or rigidity, while at the same time attaining a decrease in the weight and cost of a seat.

In view of the above technical problems, according to an aspect of the invention, there is provided a seat cushion frame structure of a seat for a vehicle comprising a seat cushion frame structure, a rear end of which is connected to a lower end of a seat back frame structure in such a way that the seat back frame structure can be inclined relative to the seat cushion frame structure, said seat cushion frame structure includes a pair of side frames spaced apart from each other in the widthwise direction of the vehicle, each of which extends in a longitudinal direction of the vehicle, and an oblique monolithic strip on at least one of said pair of side frames an upper end of which is fixed to a side portion of said at least one of pair of side frames and a lower end of which is fixed to said seat cushion frame structure at a position forward of said upper end, said oblique wire includes a characteristic that, in a case where a load toward a rear side of the vehicle is loaded on said seat cushion frame structure, it has a tension force exerted on said seat cushion frame structure so as to alleviate a moment acting on said seat cushion frame structure caused by said load, said oblique monolithic strip is arranged in such a way that one of the strip surfaces opposed to each other is oriented to be upward, its cross section perpendicular to the opposed strip surfaces is a rectangle, long in a lateral direction, and said oblique monolithic strip includes at each of its upper and lower ends a wound portion which is wound in a loop manner in such a way that said one of said opposed strip surfaces is oriented to be inward, whereby said oblique monolithic strip is fixed on said seat cushion frame structure via said wound portions with its side surface facing said side frame.

According to the seat cushion frame structure of a seat for a vehicle of the present invention, based on the fact that, with respect to a supposed impact load loaded on a seat back frame structure, the impact load toward the rear side of the vehicle is set to be higher than that toward the front side of the vehicle, a sectional shape of at least one of a pair of side frames can be determined so as to set a section modulus of at least one of the pair of side frames in such a way that at least one of the pair of side frames can withstand a bending moment caused by the impact load loaded toward the front side of the vehicle, and in a case where the impact load is loaded toward the rear side of the vehicle, when such an impact load is transmitted to the seat cushion frame structure through a recliner mechanism constituting a connection portion between the seat cushion frame structure and the seat back frame structure, it is possible to cause an oblique monolithic strip to share a difference between said impact load toward the front side of the vehicle and that toward the rear side of the vehicle by positioning the oblique monolithic strip relative to the side frame so as to cause a tension force from the oblique monolithic strip to be exerted on the seat cushion frame structure in such a way that said bending moment acting on the seat cushion frame structure based on said impact load toward the rear side of the vehicle can be alleviated.

More specifically, the upper end of the oblique monolithic strip is fixed on the side portion of the side frame of the seat cushion frame structure, while the lower end thereof is fixed on a portion of the seat cushion frame structure forward of the upper end, so that it is positioned in such a way that a tension force is applied thereto due to an impact load in the rearward direction of the vehicle.

In such a case, according to the conventional oblique wire which is formed by bundling a plurality of helical stranded lines, the stranded lines are caused to be straightened due to the tension force on the oblique wire, so that a slippage is caused between the adjacent stranded lines, while a slippage is also caused at caulking portions of the ring portions fixed on the upper and lower ends of the oblique wire by caulking, whereby an apparent tension rigidity is decreased, whereas, by adopting an oblique monolithic strip, not such a wire structure, the slippage between the stranded lines can be prevented, while at the same time, by winding the upper and lower ends of the oblique monolithic strip to form wound portions, and then, fixing the oblique monolithic strip on the seat cushion frame structure via said wound portions, a cost for manufacturing the oblique monolithic strip can be reduced while the slippage of the caulking portion can be prevented, and as a result, the apparent tension rigidity can be effectively prevented from being decreased.

In addition, in the present oblique monolithic strip, one of the opposed strip surfaces is arranged to be upward and its cross section perpendicular to the strip surface is made rectangular, long in a lateral direction, so that, in a case where an impact load in the forward direction of the vehicle is applied on the vehicle due to a front-end collision, a trivial, buckling can be induced upon an outer compressive force being applied to the present oblique monolithic strip before it is largely deformed, by fixing the present oblique monolithic strip on the seat cushion frame structure via the wound portions with its side surface facing the side frame, whereby the structural integrity of the present oblique monolithic strip can be maintained even if such a compressive force is applied thereto.

Since it becomes unnecessary to set a sectional shape of each of the pair of side frames of the seat cushion and the seat back frame structures so as to withstand the impact load toward the rear side of the vehicle, a necessary strength or rigidity can be secured, while at the same time the weight of the pair of side frames can be decreased by means of the oblique monolithic strip.

In another embodiment of the present invention, said wound portion at said upper end of said oblique monolithic strip is formed on the same side thereof as that on which said wound portion at said lower end of said oblique monolithic strip is formed by inwardly winding the same strip surface of the strip surfaces opposed to each other.

In another embodiment of the present invention, said upper and lower ends of said oblique monolithic strip are fixed on an outer side surface of said side frame of said seat cushion frame structure in such a way that said oblique monolithic strip can rotate about the widthwise direction of the vehicle.

In another embodiment of the present invention, said oblique monolithic strip further includes a means for adjusting an initial tension force generated thereon.

In another embodiment of the present invention, a recliner is provided between said seat cushion frame structure and said seat back frame structure so as to allow the seat back to incline relative to the seat cushion, said recliner comprises a base member fixed to said seat cushion, a rotational arm rotatably supported by said base member and fixed to the seat back, a sliding lock member which is interposed between said base member and said rotational arm and is guided by a concave side wall formed on said base member and forms outer teeth at its tip portion, a rotational cam which moves said sliding lock member between a locking position where said sliding lock member mates with inner teeth formed on said rotational arm and a lock releasing position where said sliding lock member disengages the inner teeth, and an actuation lever which rotates said rotational cam, said base member is a circular plate provided on a central portion of said base member and including a bracket portion with a perforated hole into which a pivot shaft of said actuation lever penetrates, said seat cushion frame structure further includes a base bracket at a side opposite to said rotational arm, said base bracket is provided with a mounting portion for fixing said base bracket to the seat cushion, the upper end of said oblique monolithic strip is fixed on said mounting portion.

In another embodiment of the present invention, said tension force adjusting means includes a means for adjusting a distance between said mounting portion of said base bracket on which said upper end of the oblique monolithic strip is mounted and a mounting portion of said side frame on which said lower end of the oblique monolithic strip is mounted, and a predetermined deflection in the direction perpendicular to the longitudinal direction thereof when it is mounted on said seat cushion frame structure, whereby the tension force is generated on the oblique monolithic strip by decreasing said deflection using said distance adjusting means.

In another embodiment of the present invention, said base bracket is mounted on said side frame in such a way that said mounting portion of said base bracket can be rotated between a position where said oblique monolithic strip can be mounted on said seat cushion frame structure and a position where the initial tension force is generated on the oblique monolithic strip by pressing the top portion of the seat back frame structure in the rearward direction of the vehicle while said cam remains at said engaging position.

In another embodiment of the present invention, said base bracket includes, below a penetrating hole into which the pivot shaft of said actuating lever penetrates, a first mounting hole and a second mounting hole between said first mounting hole and said mounting portion of said oblique monolithic strip, said base bracket is fixed on said side frame by making bolts penetrate into said first and second mounting holes, respectively, said second mounting hole is formed to be an elongated hole by which said mounting portion of said base bracket can rotate between said mounting position and said initial tension force generating position.

In another embodiment of the present invention, said initial tension force generating means includes a sloped disk which is rotatably fixed to be supported by either of said wound portions and includes an elongated opening, a guide block which fits with said sloped disk in a non-rotatable manner and includes an opening, a pin including a head portion which can be fixed on said side frame in a non-rotatable manner and a shank portion which includes at its tip portion a threaded portion and a sufficient length as to make said opening of said side frame, said elongated opening of said sloped disk, and said opening of said guide block penetrate thereinto, and a nut which can be threaded into said pin via a washer, said sloped disk includes at its one surface an elongated groove into which said guide block can fit, said elongated groove is so provided as to extend in the same direction as the longitudinal direction of said elongated opening and includes an inclined bottom surface which is inclined at a predetermined angle, said guide block is fixed on said pin in a non-rotatable manner and includes an abutting surface which can abut against an end face of said nut via said washer, and an inclined surface at the side opposite of the abutting surface which can abut against the inclined bottom surface while said abutting surface is kept abutting against the end face of said nut, said initial tension force adjusting means is provided on either of said upper and lower ends of said oblique monolithic strip to serve as a mechanism by which said oblique monolithic strip is mounted on said side frame.

In another embodiment of the present invention, said shank portion includes at its root portion a non-circular cross section with plane sections opposed to each other, each of said opening portion of said side frame and said opening portion of said guide block is shaped in such a way that said non-circular cross section snugly fits thereinto, said elongated opening portion of said sloped disk includes a longitudinal length sufficient for said non-circular cross section of said shank portion to move in the longitudinal direction when said non-circular cross section of said shank portion fits into said elongated opening.

In another embodiment of the present invention, said elongated groove includes guided side surfaces opposed to each other, each of which extends from the corresponding one of the opposed edge portions extending in the longitudinal direction of said inclined bottom surface to said one surface, said guide block includes guiding side surfaces opposed to each other, whereby said guided side surfaces of said sloped disk are guided along said guiding side surfaces of said guide block by said guide block being moved toward said side frame.

In another embodiment of the present invention, each of said openings of said wound portions is shaped to be circular, said sloped disk includes a cylindrical body section an outer peripheral surface of which can fit into the circular opening of said wound portion and a circular protruding flange which is formed to be coaxial with said cylindrical body section, a shoulder section which can abut against the side surface of said oblique monolithic strip is formed between said circular protruding flange and said cylindrical body section, said elongated groove extending through an outer edge of said circular protruding flange.

In another embodiment of the present invention, the width of said elongated opening is set to be narrower than that of said elongated groove, said elongated opening of said sloped disk is provided on said inclined bottom surface of said elongated groove.

In another embodiment of the present invention, said oblique monolithic strip is provided on the side portion of each of said pair of side frames.

In another embodiment of the present invention, said oblique monolithic strip includes an overlapping portion of one of said opposed strip surfaces thereof near said wound portions of its respective upper and lower ends, each of the portions of said oblique monolithic strip constituting said overlapping portion includes an elongated opening in its longitudinal direction, a bolt including a shank portion which can penetrate into said elongated opening and a nut which can thread into said bolt are provided, whereby said portions of said oblique monolithic strip are fixed to each other by screwing said nut on the bolt.

In another embodiment of the present invention, said oblique monolithic strip includes an overlapping portion of one of said opposed strip surfaces thereof near said wound portions of its respective upper and lower ends, portions of said oblique monolithic strip constituting said overlapping portion are fixed to each other by spot welding or projection welding.

According to an aspect of the present invention, there is provided a seat for a vehicle comprising a pad to cover the entirety of said seat cushion frame structure and a skin sheet in a bag form to cover the entirety of said seat cushion frame structure and said pad.

According to the seat for the vehicle of the present invention, in a case where the seat for the vehicle is completed by mounting a pad on the above frame structure of the seat for the vehicle, the embedding of the oblique wire into the pad can prevent a visual appearance of the seat for the vehicle from being deteriorated.

BRIEF DESCRIPTION OF THE DRAWINGS

FIG. 15 is a general view showing a locking situation by a recliner of a seat for a vehicle in the first embodiment of the present invention.

FIG. 16 is a general view showing a lock releasing situation by a recliner of a seat for a vehicle in the first embodiment of the present invention.

FIG. 17 is a partial side view showing a situation in which a tension force is generated on the oblique monolithic strip of the first embodiment of the present invention.

FIG. 23 is a general view showing a situation in which the conventional oblique wire is mounted on the seat back frame structure and the seat cushion frame structure.

DETAILED DESCRIPTION OF EMBODIMENTS OF THE INVENTION

The embodiment of the present invention in which the seat for the vehicle is applied to a front seat of an automobile will be described in detail with reference to the drawings as an example.

Figure 1:
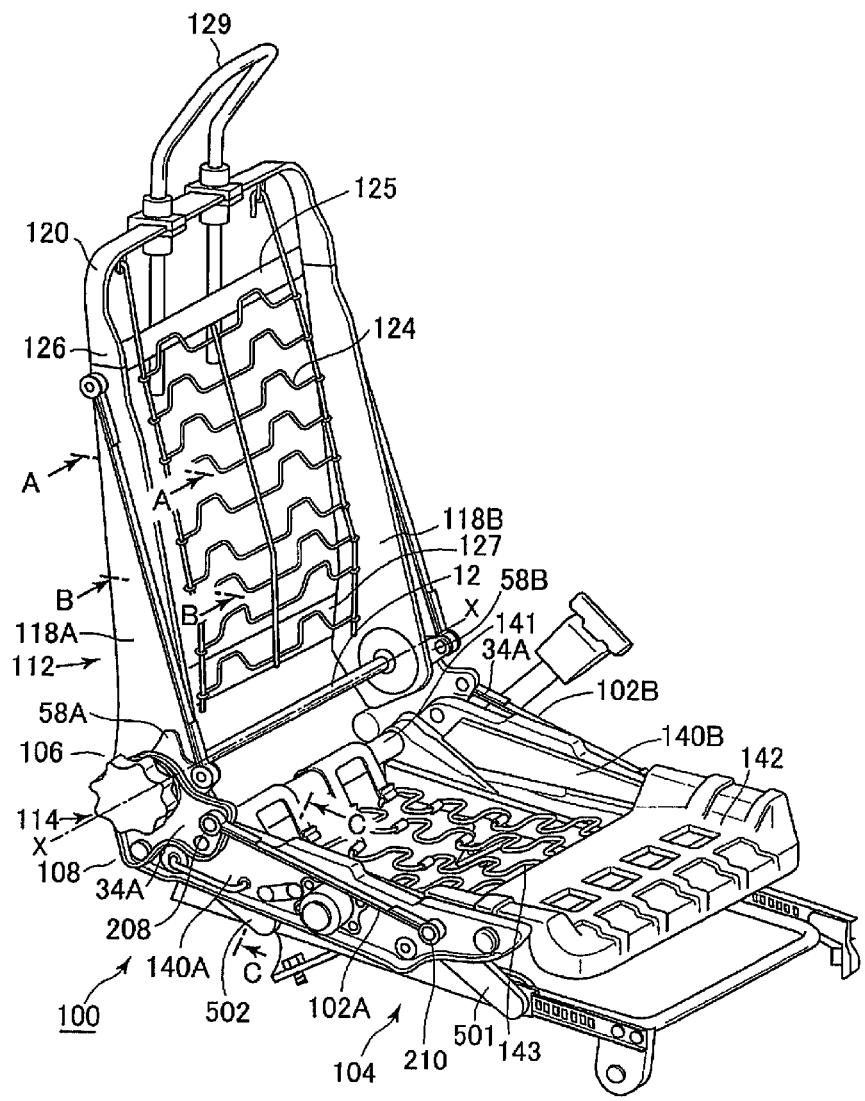
FIG. 1 is a perspective view showing a seat for a vehicle in a first embodiment of the present invention.
Figure 2:
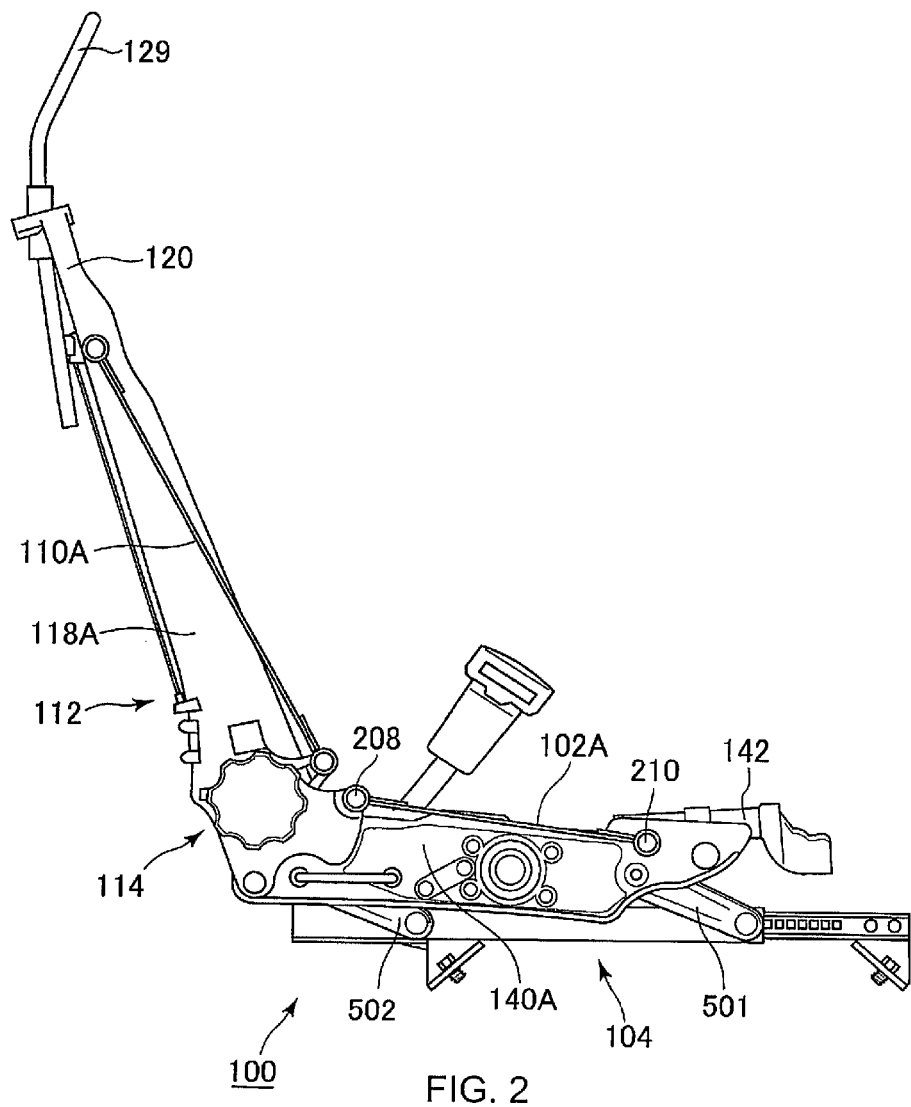
FIG. 2 is a side view showing a seat for a vehicle in the first embodiment of the present invention.

As shown in FIGS. 1 and 2, a seat 100 for a vehicle of the present invention comprises a seat cushion frame structure portion 104 which is fixed on a floor of a vehicle compartment, a seat back frame structure portion 112, a lower end portion 106 of which is connected to a rear end portion 108 of the seat cushion frame structure 104 portion 104 so as to incline relative thereto, a recliner structure portion 114 interposed between the seat cushion frame structure portion 104 and the seat back frame structure portion 112, a pad (not shown) so as to cover the entire seat frame structure for the vehicle, and a skin sheet (not shown) so as to cover the entire seat frame structure and the pad. In FIG. 1, a rotational axis X-X is shown. In FIGS. 1 and 2, the forward direction of the vehicle corresponds to the right direction in the drawings.

Explaining about the seat back frame structure portion 112, the seat back frame structure portion 112 is shaped to be a reversed U as a whole and includes a pair of side frames 118A, B spaced away from each other in the widthwise direction of the vehicle, each of which extends in the vertical direction, and an upper frame 120 which connects the upper portions of the pair of side frames 118A, B.

Figure 3:
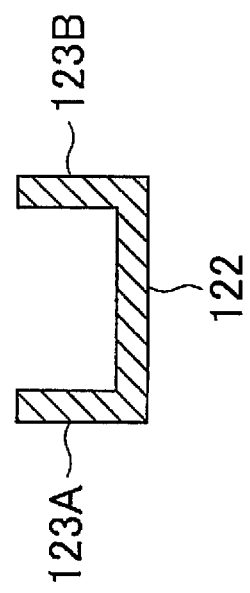
FIG. 3 is a cross sectional view taken along a line A-A in FIG. 1.

As shown in FIG. 3, each of the pair side frames 118A, B includes a main side face portion 122 with a width in the longitudinal direction of the vehicle mainly defining an external shape and protruding flange portions 123A, B inwardly protruding from the front and the rear edges of the main side face portion 122, respectively, to form a C-shaped cross section inwardly oriented.

A flat mat 124 is provided on an opening formed inside of the reversed U-shaped seat back frame structure 112, and an upper member 125 connecting the upper portions of the pair of side frames 118A, B and a lower member 127 connecting the lower portions of the pair of side frames 118A, B are provided. In addition, a member 129 on Which a head rest (not shown) is mounted is provided on the upper frame 120. Both lower end portions of the upper frame 120 is shaped to be a C-shaped cross section, like the pair of side frames 118A, B, whereby each lower end is fitted to the corresponding upper portion of the pair of the side frames 118A, B.

As shown in FIGS. 1 and 2, the seat cushion frame structure 104 will be now described. The seat cushion frame structure 104 generally comprises a pair of side frames 140A, B spaced away from each other in the widthwise direction, each of which extends in the longitudinal direction, a rear frame 141 connecting rear end portions 108 of the pair of side frames 140A, B, and a front frame 142 connecting front end portions of the pair of side frames 140A, B, whereby a closed cross sectional structure (a box structure) is formed by these frames. Cushion springs 143 each of which extends in the longitudinal direction between the rear frame 140 and the front frame 142 are provided on an opening of the closed cross sectional structure.

Figure 4:
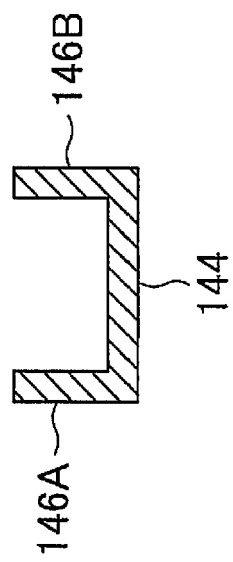
FIG. 4 is a cross sectional view taken along a line C-C in FIG. 1.

As shown in FIG. 4, each of the pair of side frames 140A, B is almost the same structure as that of the side frame 118 of the seat back frame structure portion 112, more specifically, each of the pair of side frames 140A, B includes a main side portion 144 with a width in the vertical direction constituting an external shape, and protruding flange portions 146A, B inwardly protruding from upper and lower edges of the main side portion 144, respectively, whereby an inwardly oriented C-shaped cross section is formed as a whole. The width of the main side portion 144 in the vertical direction is substantially constant over the longitudinal direction of the vehicle.

Explaining about the oblique monolithic strips 102A, B, they are mounted on the side portions of the pair of the side frames 140A, B, respectively. Since the oblique monolithic strips 102A, B have the same structure, one of them will be described below.

Figure 5:
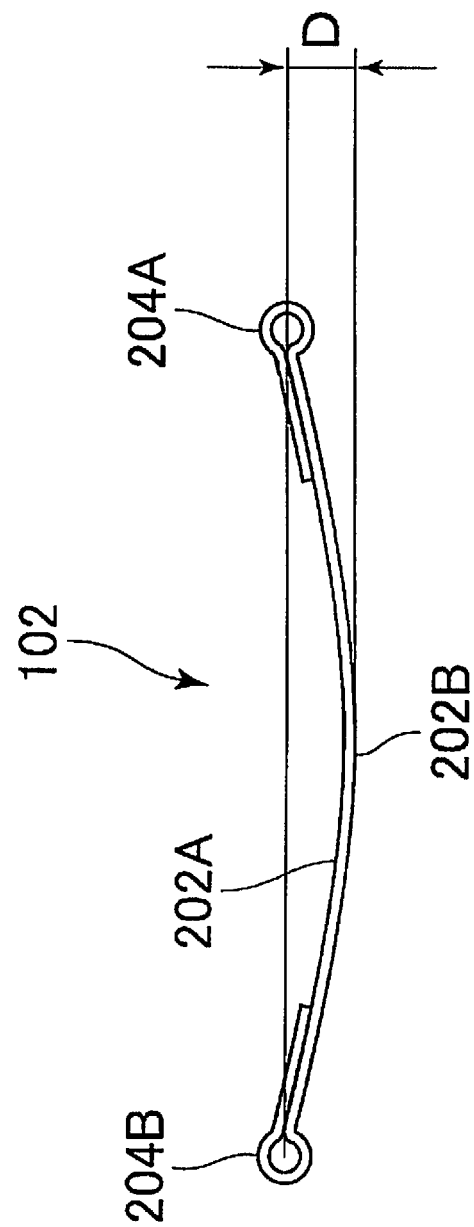
FIG. 5 is a side view of an oblique monolithic strip of the first embodiment of the present invention.

As shown in FIG. 5, the oblique monolithic strip 102 is shaped to be an elongate plate made of high tension steel, preferably, SPFC, and includes strip surfaces 202A, B opposed to each other. The cross section of the oblique monolithic strip 102 perpendicular to the strip surfaces 202A, B is a rectangle and the oblique monolithic strip 102 has a predetermined deflection D in the direction crossing the longitudinal direction thereof. When the oblique monolithic strip 102 is mounted on the side frame 140, an initial tension force is adapted to be generated on the oblique monolithic strip 102 by decreasing the deflection D, as described below. Therefore, an amount of the deflection may be appropriately determined based on the necessary initial tension force, when considering the relationship between the length of the strip and the thickness thereof.

Wound portions 204A, B, each of which is wound, fashioned in the manner of a loop, are provided on the ends of the oblique monolithic strip 102, respectively, in such a way that one of the opposed strip surfaces 202 is inwardly oriented. The oblique monolithic strip 102 is fixed on the outer side surface 209 of the side frame 140 via the wound portion 204 with its side surface 206 facing the side frame 140, so that it can be rotated about the widthwise direction of the vehicle. An opening formed by each of the wound portions 204A, B may include any shape, so long as the oblique monolithic strip 102 can be pinned to the side frame 140 by making a pin penetrate into said opening and then, screwing the nut on the pin, as described below. Said opening may be preferably a circle.

Figure 6:
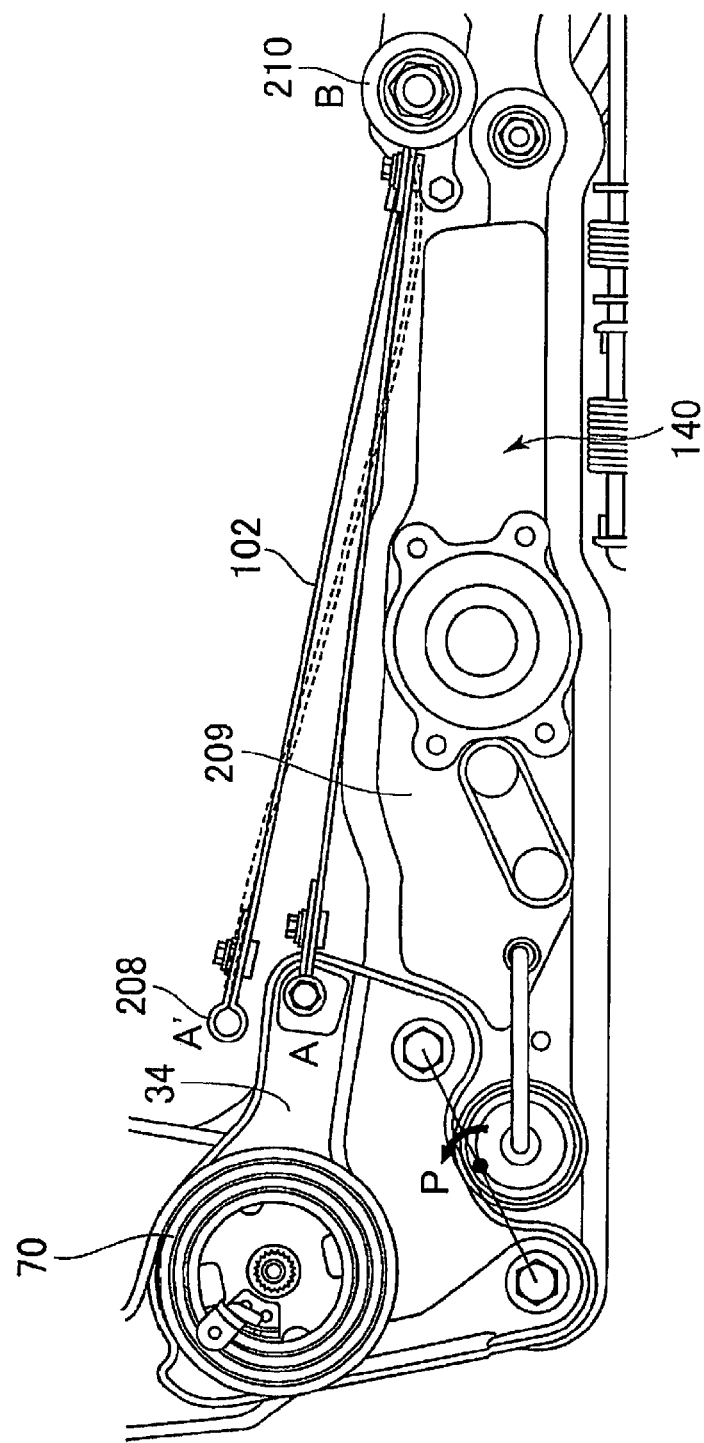
FIG. 6 is a partial side view showing a situation in which a tension force is applied on the oblique monolithic strip of the first embodiment of the present invention.

As shown in FIG. 6, when a rearward impact load is applied on the seat back B, based on the fact that one end of the oblique monolithic strip 102 is mounted on the base bracket 34, as described below, since the base bracket 34 can rotate in the counterclockwise direction about the central point P of its mounting point, as shown by an arrow, the mounting point of the one end of the oblique monolithic strip 102 is moved from A to A'. In such a case, since the length AB becomes shorter than that A' B, the tension force is generated on the oblique monolithic strip 102. However, if both ends of the oblique monolithic strip 102 are fixed to be supported by the side frame 140, the oblique monolithic strip 102 can bend as shown by a dotted line, so that it becomes difficult to secure a sufficient strength. That is why such a bend can be prevented from being generated on the oblique monolithic strip 102 in advance to secure its strength by the fact that both ends of the oblique monolithic strip 102 are pinned on the side frame 140 in such a way that the oblique monolithic strip 102 can rotate about the widthwise direction of the vehicle.

The side at which the one wound portion 204 at the upper end of the oblique monolithic strip 102 is formed by winding inwardly one of the strip surfaces 202 A, B is the same as the side at which the other wound portion 204 at the lower end of the oblique monolithic strip 102 is formed.

Figure 7:
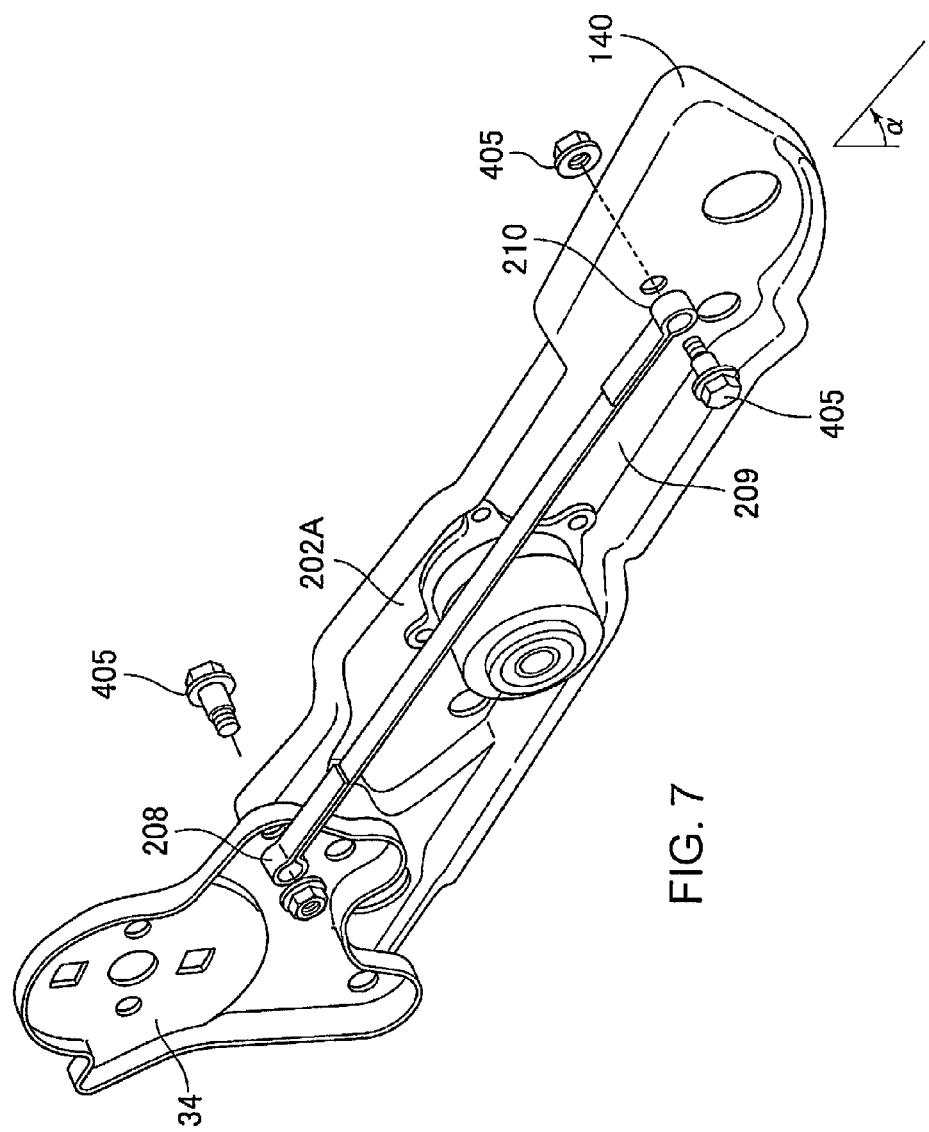
FIG. 7 is a partial detailed view showing wound portions of the oblique monolithic strip of the first embodiment of the present invention.

As shown in FIG. 7, the oblique monolithic strip 102 is arranged in such a way that one of the opposed strip surfaces 220A, B is oriented to be upward and its cross section perpendicular to the opposed strip surfaces 220A, B is a rectangle, long in a lateral direction. The oblique monolithic strip 102 is arranged to be obliquely in such a way that its upper end 208 is fixed on the side portion of one of the pair of side frames 140, while its lower end 210 is fixed on the seat cushion frame structure 104 at a position forward of the vehicle from the upper end 208. An oblique angle α may be appropriately set in accordance with the supposed impact load, etc.

Figure 8:
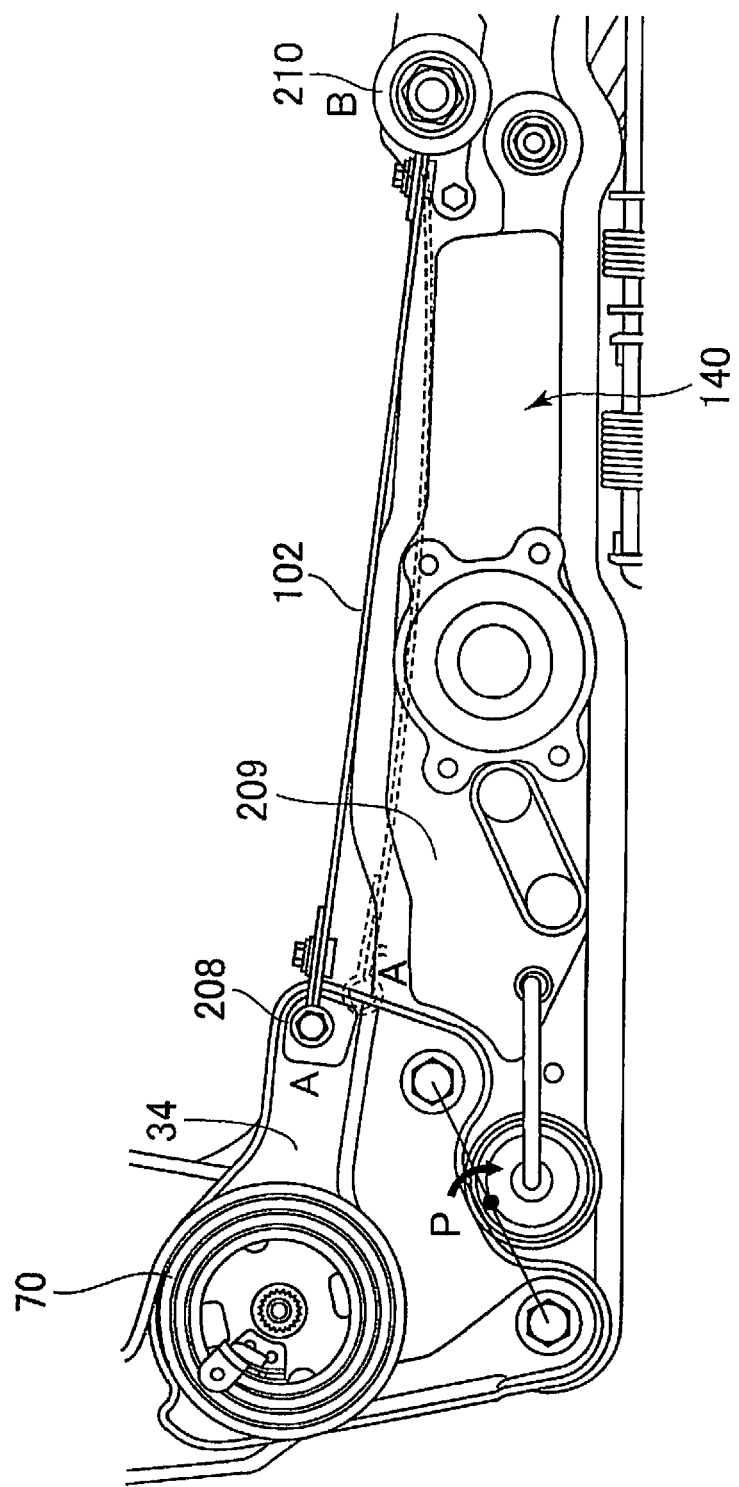
FIG. 8 is a partial side view showing a situation in which a compressive force is applied on the oblique monolithic strip of the first embodiment of the present invention.

In this case, as shown in FIG. 8, when the forward impact load is applied on the seat back, based on the fact that the one end of the oblique monolithic strip 102 is mounted on the base bracket 34, as described below, since the base bracket 34 can rotate in the clockwise direction about the central point P of the mounting point of the base bracket 34 as shown by an arrow, the mounting point of the one end of the oblique monolithic strip 102 is moved from A to A". In such a case, since the length AB becomes longer than that A" B, a compressive force is generated on the oblique monolithic strip 102. However, if both ends of the oblique monolithic strip 102 are fixed to be supported by the side frame 140, a buckling due to such a compressive force is hard to occur, so that a large deformation of the oblique monolithic strip 102 can be suddenly caused. Accordingly, a trivial buckling can be induced by the fact that both ends of the oblique monolithic strip 102 are pinned to be supported by the side frame 140 so as to be rotatable about the widthwise direction of the vehicle, so that such a large deformation can be prevented in advance due to the fact that energy is absorbed through such a trivial buckling, and as a result, the strength of the oblique monolithic strip 102 can be secured. In this connection, if either of the two ends of the oblique monolithic strip 102 is pinned, as compared with a case where both ends are fixed, the buckling can be easily induced.

The upper end 208 of the oblique monolithic strip 102 is mounted on the base bracket 34 of the recliner structure 114 described below, while its lower end 210 is mounted on the outer side surface 209 of the side frame 140, by a bolt-nut mechanism 405, respectively.

In such a case, in a case where a parallelogram link mechanism (not shown) for adjusting the height of the seat cushion from the vehicle floor which includes front and rear links 501, 502 each pinning between the vehicle floor and the side frame 140 of the seat cushion frame structure 104 is provided, the lower end 210 of the oblique monolithic strip 102 may be near the pinning portion of the front link 501 on the side frame 140, while the upper end thereof may be rearward of the vehicle and above the lower end 210 as much as is possible. This allows for the oblique monolithic strip to be effectively operated upon the collision of the vehicle by increasing the inclination angle α, thereby causing a deformation of the side frame 140 to be alleviated.

Figure 9:
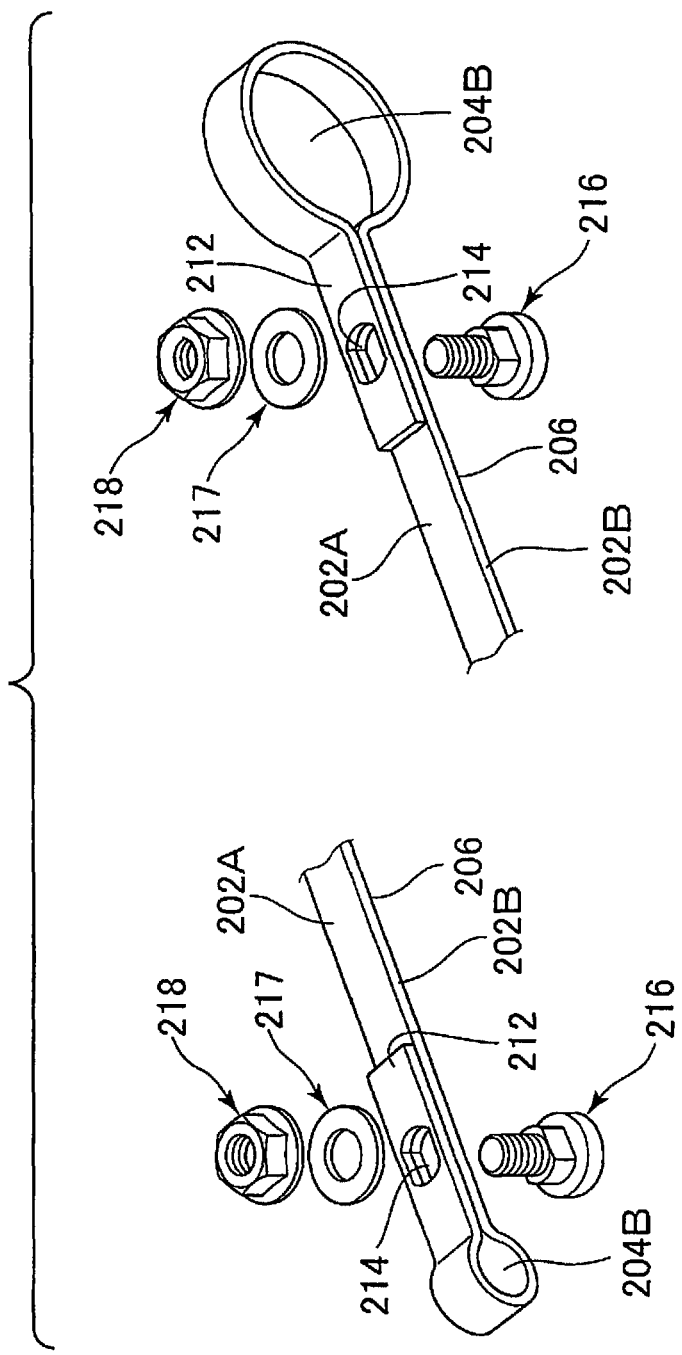
FIG. 9 is a partial detailed view showing a method of mounting one of the wound portions of the oblique monolithic strip of the first embodiment of the present invention.

As shown in FIG. 9, the oblique monolithic strip 102 includes an overlapping portion 212 of one (202A) of its strip surfaces 202 near the respective wound portion 204A, B of the upper and lower ends 208, 210, respective portions of the oblique monolithic strip 102 each constituting the overlapping portion 212 includes an elongated opening 214 in the longitudinal direction of the oblique monolithic strip 102. A bolt 216 including a shank portion which can penetrate into the opening portion 214, and a nut 218 which can threaded into the bolt 216 are provided.

Each of the overlapping portions of the oblique monolithic strip 102 can be fixed by screwing the nut 218 on the bolt 216. Alternatively, the portions of the oblique monolithic strip 102 constituting the overlapping portions may be fixed by means of a spot welding or a projection welding. In the conventional oblique wire, a ring portion by which the side frame 140 is mounted was provided separate from the wire, whereby the wire was fixed by caulking the wire. This allows the oblique monolithic strip 102 to be of a monolithic structure, whereby such a process of caulking can be omitted.

Figure 10:
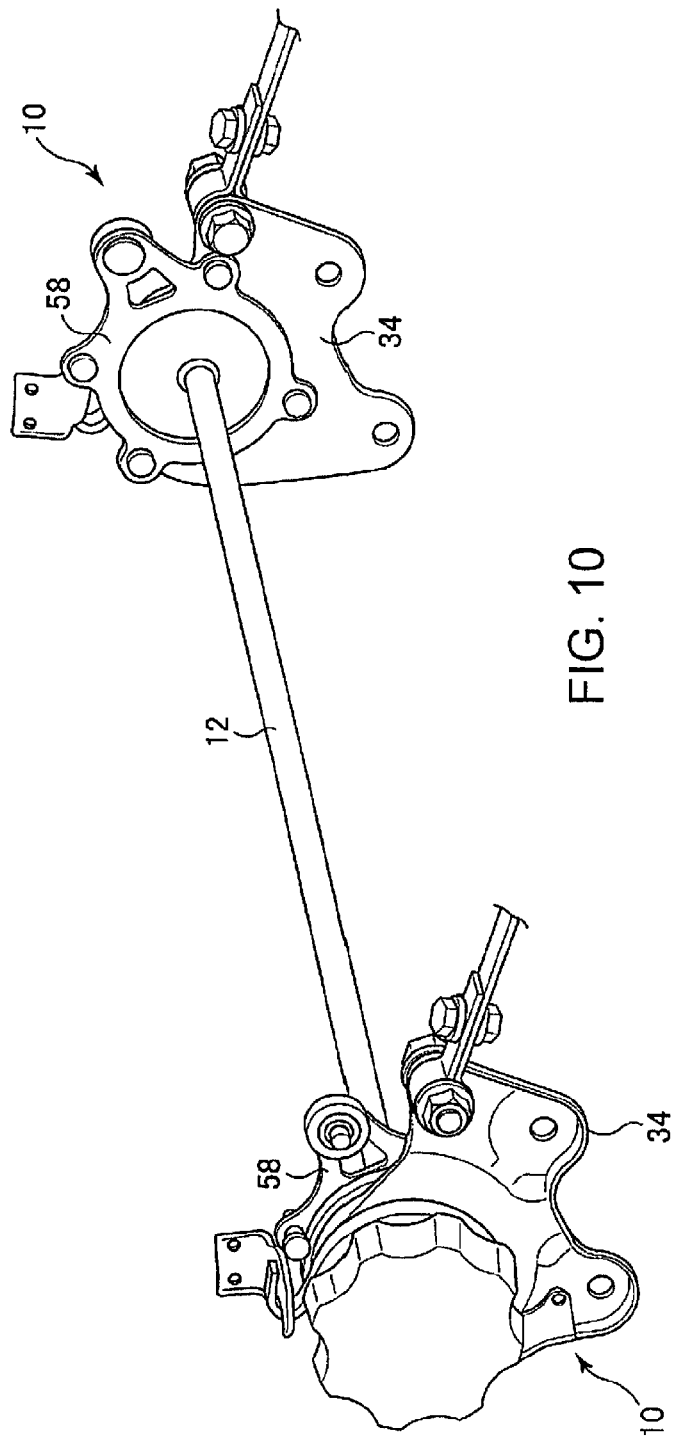
FIG. 10 is a general perspective view showing a recliner of a seat for a vehicle in the first embodiment of the present invention.

Next, explaining about the recliner structure 114, as shown in FIG. 10, the recliners 10 are provided on portions, each of which connecting a side surface of the seat cushion frame structure 104, on which a driver or a passenger sits and the corresponding side surface of the seat back frame structure 112 against which a driver or a passenger leans, respectively. A pair of recliners 10 are connected by a connecting shaft 12 extending in the widthwise direction so as to allow for the seat back B to incline relative to the seat cushion C. Since the pair of recliners 10 have the same structure except for the fact that a knob is provided on one of the recliners, one of the recliners will be described below.

Figure 11:
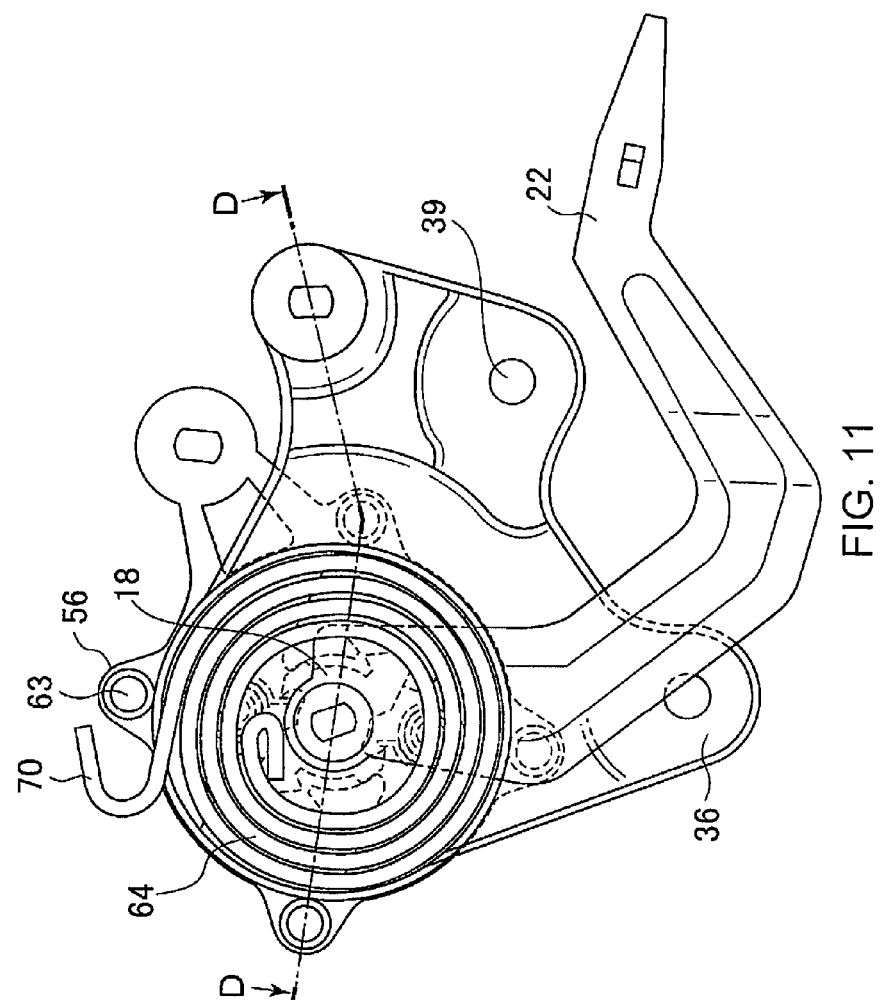
FIG. 11 is a side view showing a recliner of a seat for a vehicle in the first embodiment of the present invention.
Figure 12:
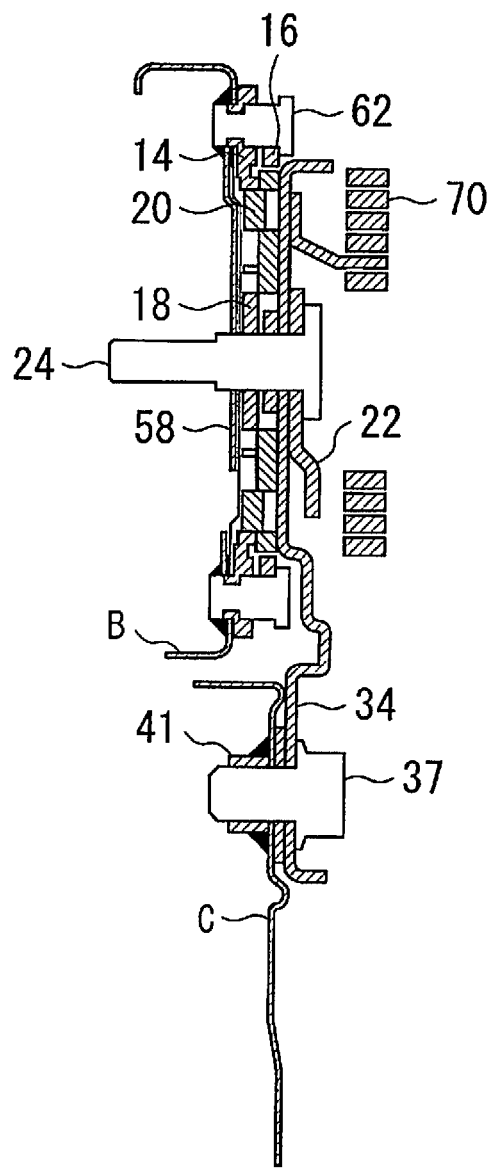
FIG. 12 is a cross sectional view taken along a line D-D in FIG. 11.
Figure 13:
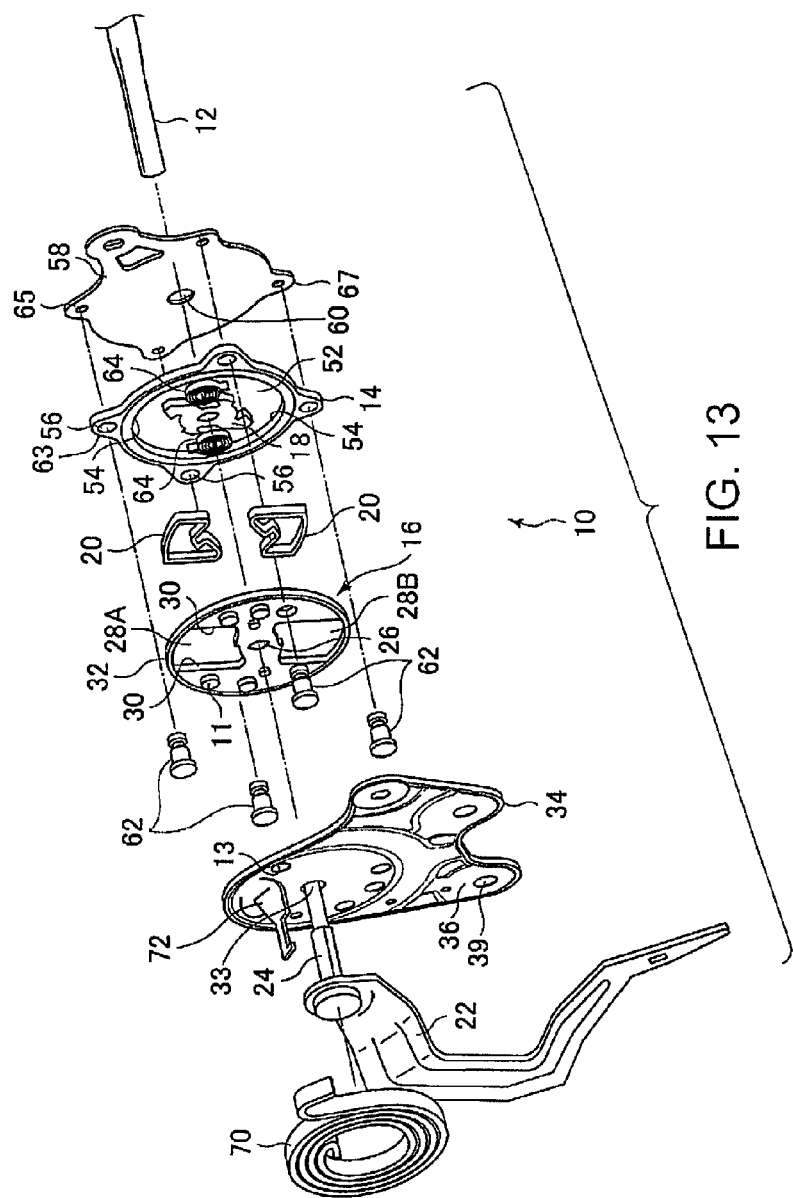
FIG. 13 is a general exploded perspective view showing a recliner of a seat for a vehicle in the first embodiment of the present invention.

As shown in FIGS. 11 to 13, each of the recliners 10 generally comprises a rotational arm 14 mounted on the seat back frame structure 112, a base member 16 mounted on the seat cushion frame structure 104, a cam 18 interposed between the rotational arm 14 and the base member 16, a pair of sliding lock members 20 disposed so as to sandwich the cam 18, and an actuation lever 22 rotating the cam 18. The rotational arm 14 is supported so as to rotate about a pivot shaft 24 fixed on the actuation lever 22.

As shown in FIG. 13, the base member 16 is a circular plate made of metal, and a perforated hole 26 into which the pivot shaft 24 penetrates is formed at its central portion. The size of the perforated hole 26 is such that the base member 16 is not rotated by the rotation of the pivot shaft 24. A pair of openings 28A, B are provided on the base member 16 in such a way that one of the openings extends at one side of the perforated hole 26, while the other of the openings extends at the other side thereof. Each of the pair of openings 28A, B is defined by a pair of right and left guiding side walls 30 and arcuate side walls 32 formed between the lower ends of the right and left guiding side walls 30 and between the upper ends of the right and left guiding side walls 30, respectively. The size of each of the openings 28 is set in such a way that each of the pair of sliding lock members 20 described below can be slid in the radial direction along the right and left guiding side walls 30 within the corresponding opening 28. The diameter of the arcuate side wall 32 is set to be substantially the same as that of a circular opening 52 of the rotational arm 14 described below.

On the side of the base member 16 opposite to the side where the rotational arm 14 is located, a base bracket 34 is provided so as to close the pair of openings 28. A perforated hole 33 into which the pivot shaft 24 penetrates is formed at the central portion of the base bracket 34 and a mounting portion 36 fixed on the seat cushion frame structure 104 is provided on the lower portion of the base bracket 34. Perforated holes 39 are provided on the mounting portion 36. The base bracket 34 and the seat cushion C are fixed to each other by a welding nut 41 by making a bolt 37 penetrate into the perforated hole 39 and the corresponding perforated hole of the seat cushion C (refer to FIG. 12). In addition, as described above, the mounting portion 36 is provided for mounting the oblique monolithic strip 102 utilizing the base bracket 34.

A plurality of protrusions 11 are provided on one of the surfaces of the base member 16, while openings 13, each of which is shaped to be complementary with the protrusion 11, are provided on a corresponding position of the base bracket 34, so that the base bracket 34 can be fixed on the base member 16 by means of welding, for instance by fitting each of the protrusions 11 into the corresponding opening 13. In the base member 16, since a load transmitting path is defined between the guiding side walls 30 and the sliding lock members 20, the thickness of the base member 16 is set so as to withstand such a load. For instance, the thickness of the base member 16 is 3.6 mm, while the thickness of the base bracket 34 is set to be thinner than that of the base member 16.

Explaining about the sliding lock members 20, the sliding lock members 20 forms a pair, and each of the pair is disposed within the corresponding opening 28 of the base member 16 so as to be freely moved in the radial direction guided by the right and left guiding side walls 30.

Figure 14A:
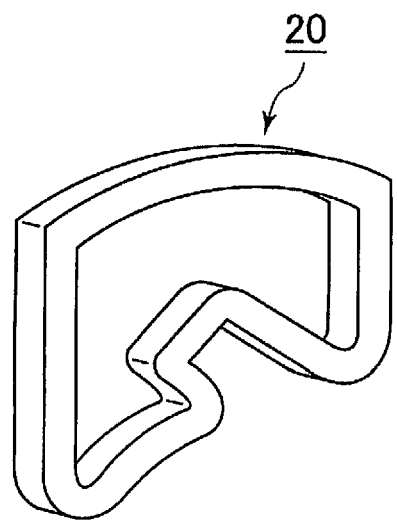
FIG. 14 is a perspective view showing a sliding lock member of a recliner in the first embodiment of the present invention.
Figure 14B:
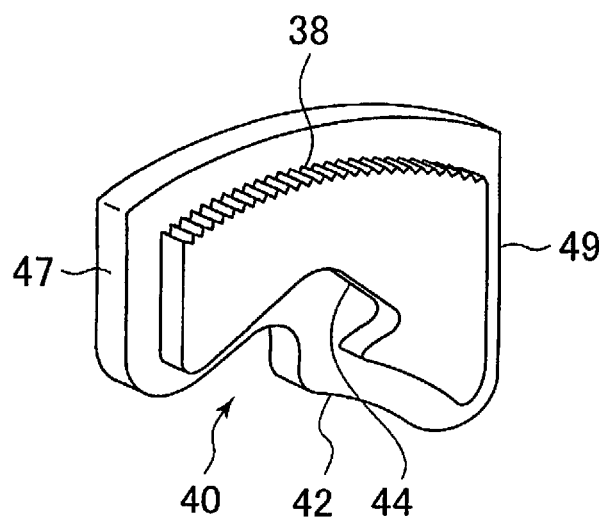

As shown in FIG. 14, in each of the sliding lock members 20, outer teeth 38 are formed on its outer peripheral side, while a cam surface 40 is formed on its inner peripheral side. Further, both side surfaces 47, 49 are formed to be parallel to each other so as to be slid, along the guiding side walls 30.

The cam surface 40 comprises a protruding engaging portion 42 inwardly protruding and an engaging concave portion 44 continuously and outwardly extending from the protruding engaging portion 42, and the protruding engaging portion 42 and the engaging concave portion 44 engage the cam 18 described below, whereby each of the sliding lock members 20 is caused to be freely moved in the radial direction between an engaging position where the outer teeth 38 mate with the corresponding inner teeth 54 formed on the rotational arm 14 described below and a release position where the mating of the outer teeth 38 with the corresponding inner teeth 54 is released.

The pair of sliding lock members 20 are disposed within a space formed between the circular opening 52 of the rotational arm 14 and the pair of openings 28 of the base member 16 when the base member 16 and the rotational arm 14 are superimposed so that the outer teeth 38 provided on each of the pair of sliding lock members 20 can mate with the corresponding inner teeth 54 provided on the circular opening 52, while the sliding lock members 20 can be guided by the guiding side walls 30 of the pair of the openings 28.

Explaining about the cam 18, as shown in FIGS. 15 and 16, the cam 18 comprises a perforated hole 17 provided on its central portion which is interposed between the pair of sliding lock members 20 and into which the pivot shaft 24 provided on the actuation lever 22 penetrates. The size of the perforated hole 17 is such that the cam 18 rotates together with the pivot shaft 24 in the same direction by the rotation of the pivot shaft 24. This causes the cam 18 to be rotated due to the rotation of the actuation lever 22. An engaging portion 43 engaging the protruding engaging portion 42 inwardly protruding and a protruding engaging portion 45 continuously and outwardly extending from the engaging portion 43 are provided on each of surfaces of the cam 18 facing the corresponding sliding lock member 20. An external shape of the cam 18 is shaped to be symmetrical with respect to its central point and the thickness thereof is set to be a little thinner than that of the rotational arm 14 described below so as not to extend up to the pair of openings 28 of the base member 16 when the cam 18 is disposed within the circular opening 52 of the rotational arm 14, unlike the pair of the sliding lock members 20. This allows for the cam 18 to be freely rotated within the circular opening 52.

Explaining about the rotational arm 14, the rotational arm 14 is an annular ring made of steel, and a circular opening 52 is provided on an inner portion thereof. In respective upper and lower portions of the annular ring constituting the circular opening 52, the inner teeth 54 mating with the outer teeth 38 of each of the sliding lock members 20 are provided on a predetermined range of the inner peripheral surface of the rotational arm 14. Since a load transmitting path between the seat back B and the seat cushion C is formed by the mating of the outer teeth 38 with the inner teeth 54 when each of the pair of sliding lock members 20 is moved to the engaging position, the thickness of the annular ring made of steel is set in such a way that the outer teeth 38 can withstand such a load. The thickness of the annular ring made of steel is 3.6 mm, for instance. In this connection, the annular ring made of steel may be formed with the circular opening 52 to form the outer teeth 38 by blanking a circular plate with an uniform thickness in a fine blanking manner.

Four bracket portions 56 by which the rotational arm 14 is mounted on the seat back B are provided on the outer peripheral portion of the rotational arm 14 equally angularly spaced apart from each other in the outer peripheral direction. A perforated hole 63 into which a hold pin 62 penetrates is provided on each of the brackets 56. In this connection, the brackets 56 may be formed integrally with the annular ring.

On the side of the rotational arm 14 opposite to the side where the base member 16 is located, a lid plate 58 is mounted so as to close the circular opening 52 and a perforated hole 60 into which the pivot shaft 24 penetrates is provided on a central portion of the lid plate 58. The size of the perforated hole 60 is such that the lid plate 58 can be rotated together with the pivot shaft 24 by the rotation of the pivot shaft 24, like the cam 18. This causes the lid plate 58 to be rotated by the rotation of the actuation lever 22. The lid plate 58 is a circular plate, the diameter of which is the same as that of the annular ring and, like the rotational arm 14, four bracket portions 67 are provided on its outer peripheral portion equally angularly spaced apart from each other. A perforated hole 65 into which a hold pin 62 described below penetrates is provided on each of the bracket portions 67. The lid plate 58 can be fixed to the rotational arm 14 so as to hold the pair of sliding lock members 20, the cam 18, springs 64 described below inside the circular opening 52 of the rotational arm 14 by penetrating the hold pin 62 into the perforated hole 63 and the corresponding perforated hole 65 of the lid plate 58 and then crimping it. In addition, as shown in FIG. 12, the base member 16 can be fixed by abutting a shoulder portion of the hold pin 62 against a peripheral edge portion of the base member 16.

In this connection, since the lid plate 58 only functions to close the circular opening 52 and does not function as a strength member, the thickness of the rotational arm 14 is 3.6 mm, for instance, whereas, that of the lid plate may be about 0.6 mm.

As shown in FIG. 13, the actuation lever 22 is mounted on the outer side of one of the recliners 10, and includes a perforated hole at one end. The actuation lever 22 can be fixed by penetrating the pivot shaft 24 into this perforated hole, the perforated hole 33, the perforated hole 26 of the base member 16, the perforated hole 17 of the cam 18, and the perforated hole 60 of the lid plate 58. The actuation lever 22 is biased so as to be rotated in one direction by a pair of springs 64 disposed within the circular opening 52.

A spiral spring 70 is provided on the outer side of one of the recliners 10 so as to be substantially parallel to and adjacent to the base member 34. The seat back B can be biased so as to be rotated in one direction relative to the seat cushion C due to the fact that one end of the spiral spring 70 is fixed on the seat back B, while the other end thereof is fixed on a holder bracket 72 provided on the base bracket 34.

As shown in FIG. 17, the oblique monolithic strip 102 includes a means for adjusting an initial tension force generated thereon. The means for adjusting an initial tension force includes a means for adjusting a distance between a mounting portion 36 of the base bracket 34 on which the upper end 208 of the oblique monolithic strip 102 is mounted and a mounting portion of the side frame 140 on which the lower end 210 of the oblique monolithic strip 102 is mounted. The oblique monolithic strip 102 is adapted to include a predetermined deflection D in the direction perpendicular to the longitudinal direction of the oblique monolithic strip 102 when it is mounted on the seat cushion frame structure 104, whereby the tension force can be generated on the oblique monolithic strip 102 by decreasing the deflection D by means of said means for adjusting a distance. In said means for adjusting a distance, the base bracket 34 is mounted on the seat cushion frame structure 104 in such a way that the mounting portion 36 of the base bracket 34 can be pivoted between the position where the oblique monolithic strip 102 can be mounted on the seat cushion frame structure (FIG. 17(A)) and the position where the initial tension force is generated on the oblique monolithic strip 102 (FIG. 17(B)) by rearwardly pushing the top portion of the seat back while the cam 18 remains being positioned at the engaging position.

The base bracket 34 includes first and second mounting holes 401, 402 below the hole 33 into which the pivot shaft of the actuating lever 22 penetrates and the second mounting hole 402 is provided between the first mounting hole 401 and the mounting portion of the oblique monolithic strip 102. The base bracket 34 is fixed to the side frame 140 by making bolts 403 penetrate into the first and second mounting holes 401, 402, respectively. The second mounting hole 402 constitutes an elongated hole by which the mounting portion 36 of the base bracket 34 can be pivoted from the mounting position to the initial tension force generating position.

This causes the tension force to be generated on the oblique monolithic strip 102 so long as it is extended from the initial condition, no matter whatever the condition of the oblique monolithic strip 102 may be, whereas, in the conventional oblique wire, since it is in code form, the tension force is not generated thereon unless it is extended from a length that is natural.

An effect of the seat 100 for the vehicle including such a structure will be described.

Firstly, in a case where the seat back B is locked to the seat cushion C, the actuation lever 22 is biased by the spring 64, so that, as shown in FIG. 15, each of the engaging portions 43 of the cam 18 is caused to engage the protruding engaging portion 42 of the cam surface 40 of the corresponding sliding lock member 20. This causes each of the sliding lock members 20 to be guided along the guiding side wall 30 of the base member 16 to be outwardly moved, whereby the outer teeth 38 and the corresponding inner teeth 54 of the rotational arm 14 mate with each other, and as a result, the locking situation in which the rotation of the rotational arm 14 relative to the base member 16 is restricted is maintained.

Under such a locking situation, in a case where an excessive impact load is loaded on the seat back B due to the collision, for instance, the excessive impact load is transmitted to the rotational arm 14 from the seat back B through the bracket portion 56, and then, is transmitted to the seat cushion C fixed on the base member 16 through the mating of the outer teeth 38 of the rotational arm 14 with the inner teeth 54 of the pair of sliding lock members 20, the engagement of the cam surface 40 of each of the pair of sliding lock members 20 with the cam 18, and the pivot shaft 24 penetrating into the cam 18. Since the thickness of the annular ring of the rotational arm 14, or the thickness of the outer teeth 38 and the thickness of the base member 16 are set to be a value so as to withstand such an impact load, the reclining function can be maintained irrespective of such an impact load.

In this case, since the rotational arm 14 includes the circular opening 52 at its inner portion, the weight of the recliner can be decreased as compared to a conventional sector gear into which a circular plate with an uniform thickness is formed by a press working. On the other hand, four brackets 56 each including a perforated hole 63 by which the rotational arm 14 is mounted on the seat back B are provided on an outer peripheral portion of the annular ring with being angularly equally spaced apart from each other, so that the weight of the recliner is increased. However, as compared to the conventional circular sector gear in which six protruding surfaces by which the rotational arm 14 is fixed on the seat back B are provided angularly equally spaced apart from each other, since the longer a distance between the bracket 56 and the pivot shaft 24 becomes, the less a load which one bracket 56 shares becomes, whereby the number of the bracket portions 56 can be decreased. This causes the weight of the bracket portions 56 of the seat back B to be further decreased.

In addition, when a compressive force is applied to the oblique monolithic strip 102, since each of its upper and lower ends 208, 210 is pinned on the side frame 140 so as to be rotatable about the widthwise direction of the vehicle, as shown in FIG. 8, a small buckling is induced before a large deformation of the oblique monolithic strip 102 is generated by each of the upper and lower ends of the oblique monolithic strip 102 being supported in a fixed manner, whereby, such a large deformation can be prevented in advance by absorbing an impact energy to some extent.

Figure 18:
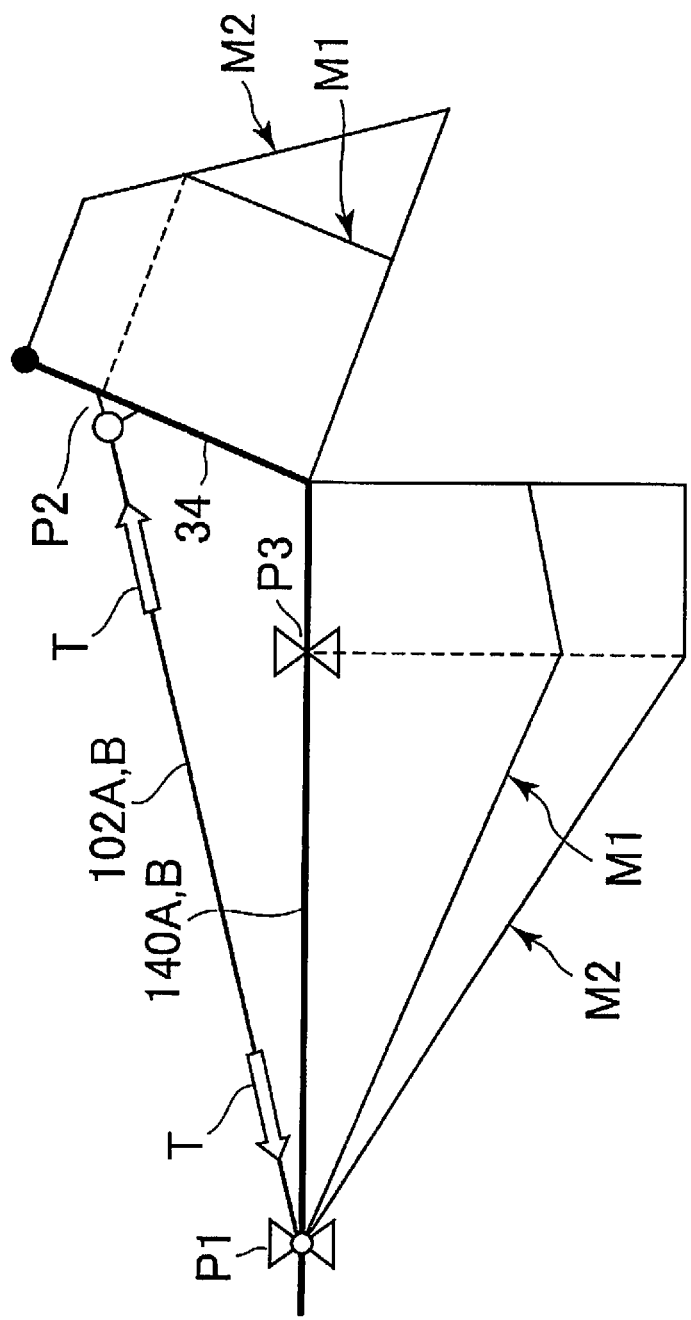
FIG. 18 is a view showing a moment generated on the seat cushion frame structure in a case where a rearward impact load is applied on the seat for the vehicle of the first embodiment of the present invention.

On the other hand, as shown in FIG. 18, in a case where the impact load toward the rear side of the vehicle, which is larger than that toward the front side of the vehicle, is loaded on the seat back B due to the collision, for instance, a bending moment which increases toward the rotational center is generated on each of the pair of side frames 140A, B of the seat cushion frame structure portion 104. In this case, a tension force is generated on the oblique monolithic strips 102A, B provided on the pair of side frames 140A, B to alleviate the bending moment on the seat cushion frame structure 104 caused by the impact load. FIG. 18 shows a bonding moment M2 which is generated in a case where no oblique monolithic strips are provided and a bending moment M1 which is generated in a case where the oblique monolithic strips 102A, B are provided. As shown in FIG. 8, M1 is shown to be smaller than M2.

Further, in a case where the tension force is applied on the oblique monolithic strip 102, since each of the upper and lower ends 208, 210 is pinned on the side frame 140 so as to be rotatable about the widthwise direction, as shown in FIG. 6, the oblique monolithic strip 102 can be effectively prevented from being deformed in a bent manner due to the fact that each of the upper and lower ends 208, 210 is supported in a fixed way.

The necessary strength or rigidity of the side frames 140A, B can be secured, while the weight thereof can be decreased, by having the oblique monolithic strips 102A, B share the difference between the impact load toward the front side of the vehicle and that toward the rear side of the vehicle without setting a cross sectional shape of the pair of side frames 140A, B and a cross sectional shape of the pair of side frames of the seat back frame structure with respect to the large impact load toward the rear side of the vehicle. In particular, conventionally, the main side surface portion of the side frame with a width extending in the vertical direction was formed so as to be diverged toward the rotational center in the longitudinal direction, however, such a degree of the divergence can be decreased, or such a tapering in the divergent manner can be substantially deleted.

More specifically, according to the conventional oblique wire, a slippage between the adjacent stranded lines can be caused when a tension force is generated on the oblique wire due to the fact that the stranded lines are caused to be straightened under the wire structure in which the plurality of helical stranded lines are bundled, while at the same time, a slippage can be also caused at the caulking portions of the ring portions fixed on the upper and lower ends of the oblique wire during the caulking process, whereby an apparent tension rigidity of the oblique wire is decreased, whereas, by adopting the oblique monolithic strip, such a slippage between the adjacent stranded lines can be prevented, and the manufacturing cost can be reduced, while at the same time such a slippage at the caulking portions can be prevented due to the fact that the wound portions 204 are formed by winding the upper and lower ends of the oblique monolithic strip and the oblique monolithic strip is fixed on the seat cushion frame structure 104 via the wound portions 204, and as a result, the apparent tension rigidity can be effectively prevented from being decreased.

With respect to the above technical point, the present inventor confirmed the above technical effect caused by the oblique monolithic strip 102 by carrying out a tension force test using the conventional oblique wire and the oblique monolithic strip 102 of the present invention under the same conditions.

Figure 19:
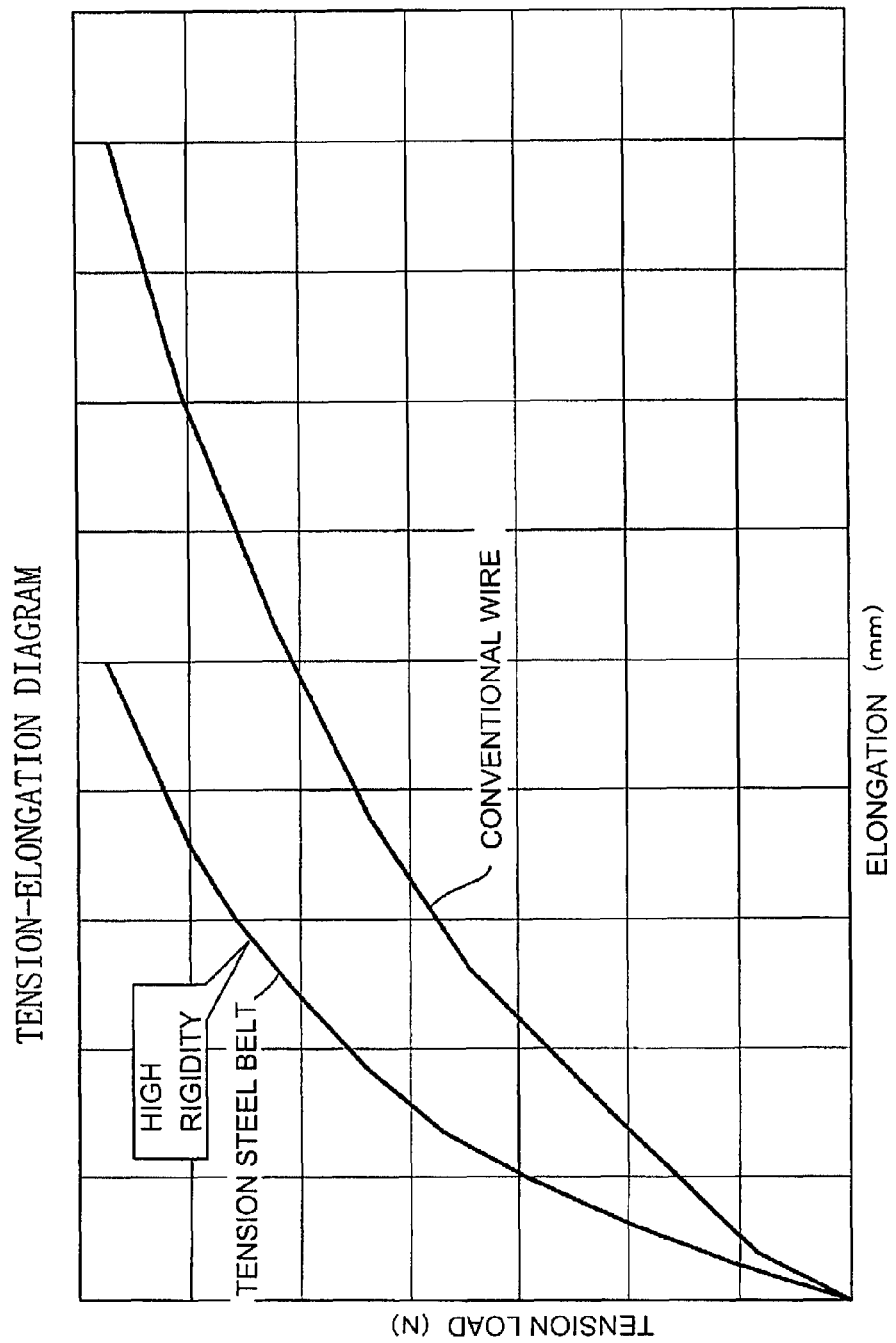
FIG. 19 is a tension-elongation diagram in the oblique monolithic strip of the first embodiment of the present invention and the conventional wire.

As shown in FIG. 19, which is a tension-elongation diagram in which the horizontal axis indicates the elongation and the vertical axis indicates the tension load, as compared with the conventional oblique wire, in the oblique monolithic strip 102 of the present invention, the gradient of the curve is steep, so that the oblique monolithic strip 102 is hard to be extended, which means that the tension rigidity is high. In particular, the initial tension force is loaded on the oblique monolithic strip 102, so that the gradient of the rising portion of the curve is prevented from becoming gentle. This prevents the actuation of the oblique monolithic strip 102 from being delayed upon the rear-end collision of the vehicle.

In this connection, in a case where the locking situation in which the seat back B is locked to the seat cushion C is released to rotate the seat back B, since, by rotating the actuation lever 22 against the biasing force of the coil spring 64, the cam 18 is also rotated in the same direction, as shown in FIG. 6, the engagement situation in which the engaging portion 43 of the cam 18 engages the protruding engaging portion 42 of each of the sliding lock members 20 is released. When the seat back B is inclined under this situation, the rotational arm 14 is caused to be rotated so that each of the sliding lock members 20 inwardly slides by a force exerted thereon from the inner teeth 54, and as a result, the engaging concave portion 44 of each of the sliding lock members 20 and the corresponding protruding engaging portion 45 of the cam 18 are brought into engagement with each other. Under such a circumstance, the mating of the inner teeth 54 with the outer teeth 38 is released. This causes the locking situation to be released, whereby the seat back B can be inclined relative to the seat cushion C by a desired angle. After the seat back B is inclined, the cam 18 is rotated in the opposite direction to cause the sliding lock members 20 to slide outwardly in the radial direction again, so that the inner teeth 54 are caused to mate with the corresponding outer teeth 38 again returning back to the locking situation.

As described above, according to the seat cushion frame structure 104 of a seat for a vehicle, based on the fact that, with respect to a supposed impact load loaded on a seat back frame structure 112, the impact load toward the rear side of the vehicle is set to be higher than that toward the front side of the vehicle, a sectional shape of at least one of a pair of side frames 140 can be determined so as to set a section modulus of at least one of the pair of side frames 140 in such a way that at least one of the pair of side frames 140 can withstand a bending moment caused by the impact load loaded toward the front side of the vehicle, and in a case where the impact load is loaded toward the rear side of the vehicle, when such an impact load is transmitted to the seat cushion frame structure 104 through a recliner mechanism constituting a connection portion between the seat cushion frame structure 104 and the seat back frame structure 112, it is possible to cause an oblique monolithic strip 102 to share a difference between said impact load toward the front side of the vehicle and that toward the rear side of the vehicle by positioning the oblique monolithic strip 102 relative to the side frame 140 so as to cause a tension force from the oblique monolithic strip 102 to be exerted on the seat cushion frame structure 104 in such a way that said bending moment acting on the seat cushion frame structure 104 based on said impact load toward the rear side of the vehicle can be alleviated.

More specifically, the upper end 208 of the oblique monolithic strip 102 is fixed on the side portion of the side frame 140 of the seat cushion frame structure 104, while the lower end 210 thereof is fixed on a portion of the seat cushion frame structure 104 forward of the upper end 208, so that it is positioned in such a way that a tension force is applied thereto due to an impact load in the rearward direction of the vehicle.

In addition, in the present oblique monolithic strip 102, one of the opposed strip surfaces 202 is arranged to be upward and its cross section perpendicular to the strip surface 202 is made rectangular, long in a lateral direction, so that, in a case where an impact load in the forward direction of the vehicle is applied on the vehicle due to a front-end collision, a trivial buckling can be induced upon an outer compressive force being applied to the present oblique monolithic strip 102 before it is largely deformed, by fixing the present oblique monolithic strip 102 on the seat cushion frame structure 104 via the wound portions 204 with its side surface facing the side frame 140, whereby the structural integrity of the present oblique monolithic strip 102 can be maintained even if such a compressive force is applied thereto.

Since it becomes unnecessary to set a sectional shape of each of the pair of side frames of the seat cushion and the seat back frame structures so as to withstand the impact load toward the rear side of the vehicle, a necessary strength or rigidity can be secured, while at the same time the weight of the pair of side frames can be decreased by means of the oblique monolithic strip.

In this case, in a case where the seat for the vehicle is completed by applying a pad to the frame structure, the appearance of the seat for the vehicle scan be prevented from being deteriorated by embedding the oblique monolithic strips 102A, B into a pad.

A second embodiment of the present invention will be described with reference to the drawings. In the following description, with respect to the same elements as those in the first embodiment, an explanation thereabout is omitted by attaching the same reference numbers to those elements, and the technical feature of this embodiment will be described in detail.

The technical features of this embodiment are a structure of the oblique monolithic strip 102 and a means for adjusting an initial tension force. More specifically, in the first embodiment, the initial tension force was roughly adjusted by utilizing the oblique monolithic strip 102 with the deflection D to decrease its deflection D, whereas, in this embodiment, the means for minutely adjusting the initial tension force is provided on the wound portion 204 of the upper end 208 or the lower end 210 of the oblique monolithic strip 102 with no deflection D.

A case where the initial tension force is provided on the wound portion 204 of the lower end 210 of the oblique monolithic strip 102 will be explained about below. In this connection, the configuration in which the upper end 208 of the oblique monolithic strip 102 is fixed to the side frame 140 is the same as that of the first embodiment.

Figure 20:
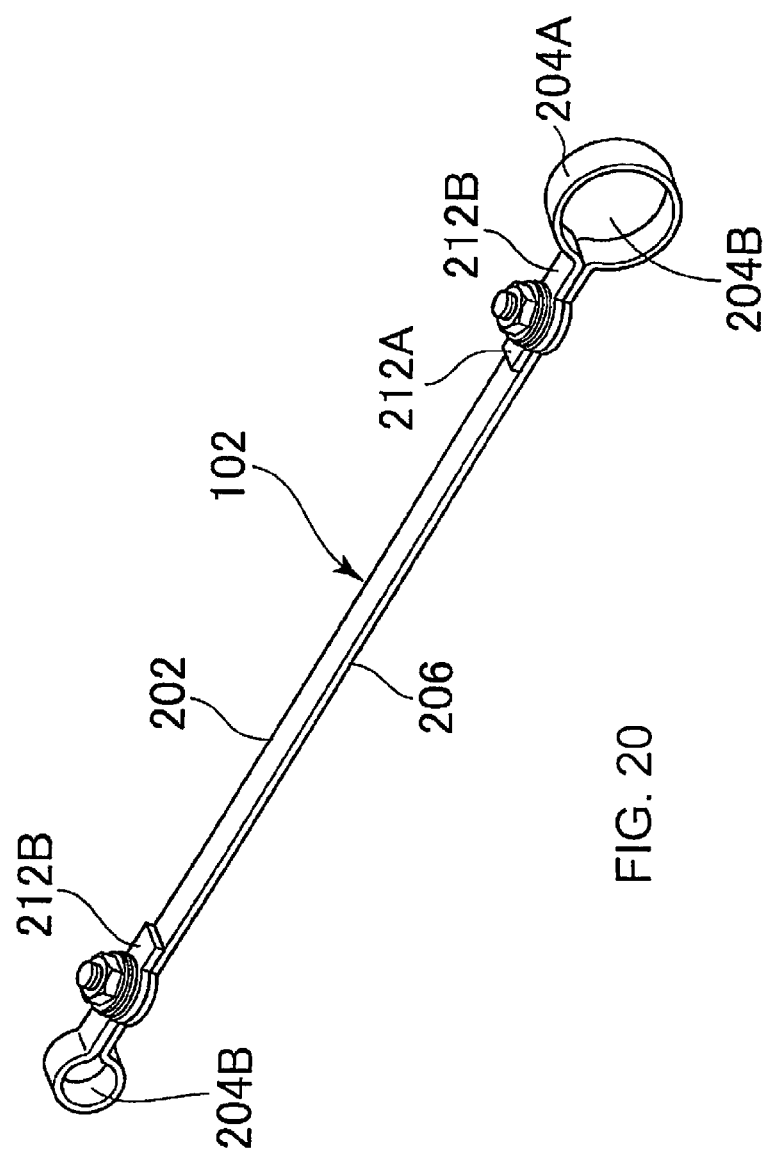
FIG. 20 is a perspective view showing the oblique monolithic strip of the second embodiment of the present invention.

As shown in FIG. 20, the oblique monolithic strip 102 is shaped to be straight between the two wound portions 204, and thus, includes no deflection D. This allows a deflecting process to be omitted, and thus, the cost for manufacturing the oblique monolithic strip 102 can be reduced. In addition, the oblique monolithic strip 102 in this embodiment is different from that of the first embodiment in the following points.

Firstly, the wound portion 204A is larger than the other wound portion 204B, in view of the fact that a means for adjusting an initial tension force described below is provided on the wound portion 204A, secondly, an opening of the wound portion 204B has to be circular.

Figure 21:
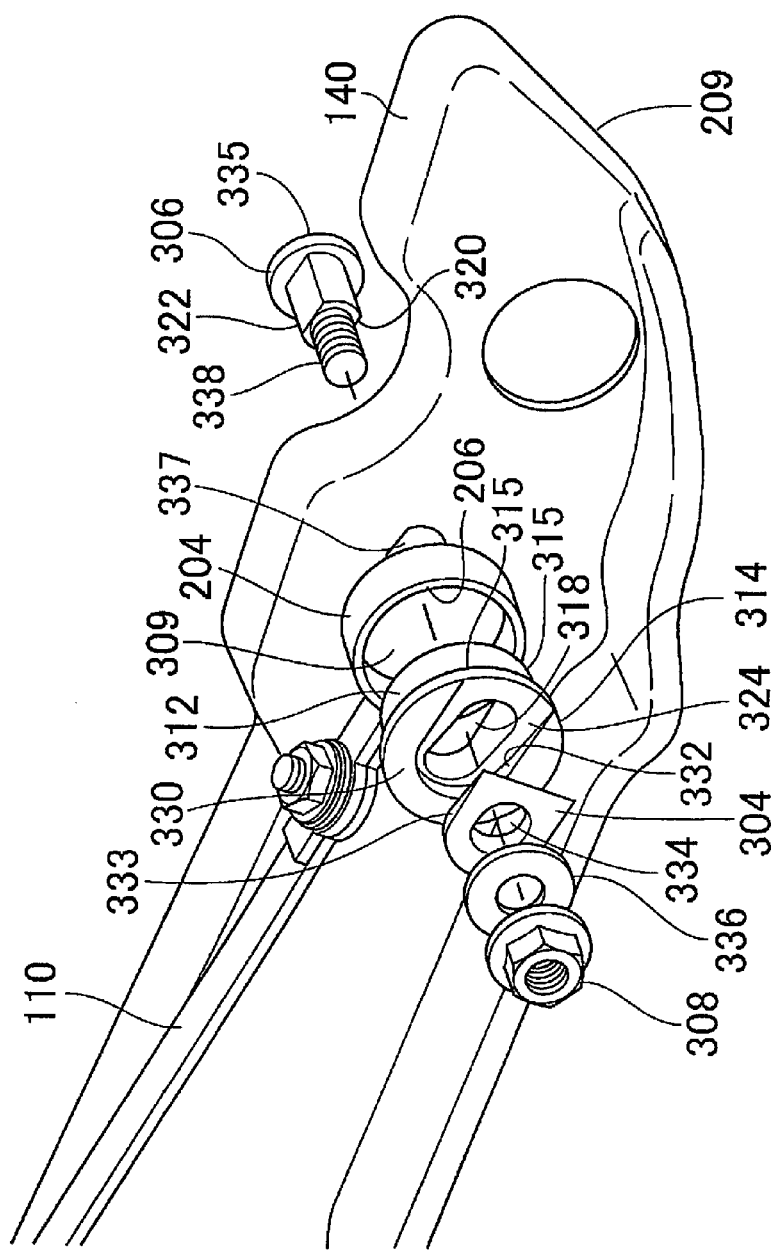
FIG. 21 is a partial detailed view showing a method of mounting the other of the wound portions of the oblique monolithic strip of the second embodiment of the present invention.

As shown in FIG. 21, the means for adjusting the initial tension force generally comprises a sloped disk 302 provided on the wound portion 204A, a guide block 304 fitted into the sloped disk 302, and a pin 306 and a nut 308 which cooperate with each other to fix the oblique monolithic strip 102 on the side frame 140 via the wound portion 204 A.

More specifically, an opening 309 of the wound portion 204 A is circular, and the sloped disk 302 is made of a resin or metal and includes a cylindrical body portion 312, an outer peripheral surface 310 of which can fit into the circular opening 309 of the wound portion 204 A, and a circular protruding flange 314 provided coaxial with the cylindrical body portion 312, so that a shoulder portion 316 which can abut against the side surface 206 of the oblique monolithic strip 102 at the wound portion 204 A is formed between the circular protruding flange 314 and the cylindrical body portion 312, whereby the sloped disk 302 can be rotatably fixed on the wound portion 204 A.

The sloped disk 302 includes an elongate opening 318 which has a sufficient longitudinal length so as to be movable in the longitudinal direction when a shank portion 320 of a pin 306 described below with a non-circular cross section. 322 fits into the elongate opening 318. This causes the sloped disk 302 to be movable by a guide block 304 described below while the pin 306 is kept fitting into the elongate opening 318.

An elongated groove 324 into which the guide block 304 can fit is provided on one surface 330 of the sloped disk 302. The elongated groove 324 is provided so as to extend in the longitudinal direction of the elongate opening 318 and includes an inclined bottom surface 326 which is inclined at a predetermined angle. The elongated groove 324 is open toward an outer edge 315 of the circular protruding flange 314.

The width W1 of the elongate opening 318 is set to be smaller than the width W2 of the elongated groove 324, and the elongate opening 318 is provided on the inclined bottom surface 326 of the elongated groove 324.

The inclined angle of the inclined bottom surface 326 (β in FIG. 22) may be appropriately set in such a way that the sloped disk 302 can be pushed, and thus, moved in the longitudinal direction of the elongate opening 318 by the guide block 304 due to the fact that the guide block 304 is pushed by the nut 308 to be moved toward the side frame 140. For instance, the inclined angle may be between 5° and 20°. If the inclined angle is less than 5°, it is technically difficult to push out the sloped disk 302 in the longitudinal direction by the nut 308, while if the inclined angle is more than 20°, the force by which the sloped disk 302 is screwed by the nut 308 becomes short, so that it is technically difficult to firmly fix the oblique monolithic strip 102 to the side frame 140.

The elongated groove 324 includes guided side surfaces 332 opposed to each other, each of which extends from the corresponding one of opposed edge portions which extends in the longitudinal direction of the inclined bottom surface 326.

The guide block 304 is made of a resin or metal, and fits with the elongated groove 324 of the sloped disk 302 so as not to be rotatable relative thereto, and includes an opening portion 334. The opening portion 334 is shaped in such a way that the shank portion 320 with a non-circular cross section of the pin 306 described below can snugly fit thereinto, whereby the guide block 304 is fixed to the pin 306 while it cannot rotate relative to the pin 306.

The guide block 304 includes an abutting surface 305 which can abut against the end face of the nut 308 via the washer 336, an inclined surface 307 at the side opposite of the abutting surface 305 which can abut against the inclined bottom surface 326 while the abutting surface 305 is kept abutting against the end face of the nut 308, and guiding side surfaces 333 opposed to each other between the abutting surface 305 and the inclined surface 307. This causes the guided side surfaces 332 of the sloped disk 302 to be guided along the guiding side surfaces 333 of the guide block 304 due to the fact that the guide block 304 moves toward the side frame 140.

The pin 306 includes a head portion 335 which can be fixed to the side frame in a non-rotatable manner, a screwing portion 338 at its tip end, and a shank portion 320 including a length sufficient to penetrate into the opening portion 337 of the side frame 140, the elongated opening 318 of the sloped disk 302 and the opening portion 334 of the guide block 304. The shank portion 320 includes at its root portion a portion 322 with a non-circular cross section which includes opposed plane sections, and the opening portion 337 of the side frame 140 is shaped in such a way that the portion 322 snugly fits thereinto, like the opening 334 of the guide block 304. This causes the pin 306 to be fixed to the side frame 140 in a non-rotatable manner, whereby the nut 308 is adapted to push the guide block 304 toward the side frame 140 by the fact that the nut 308 is threaded into the screwing portion 338 via the washer 336.

As described above, the means for adjusting the initial tension force is provided on either the upper end 208 or the lower end 210 of the oblique monolithic strip 102, so that it serves as a mounting mechanism by which the oblique monolithic strip 102 is mounted on the side frame 140. If the sloped disk 302 is rotated, and thus, oriented within the circular opening 309 of the wound portion 204 in such way that the elongated opening 318 of the sloped disk 302, or the longitudinal direction of the elongated groove 324 corresponds to the direction in which the oblique monolithic strip 102 extends, the sloped disk 302 can be moved so as to apply the tension force on the oblique monolithic strip 102 by the fact that the guide block 304 is pushed toward the side frame 140 while the oblique monolithic strip 102 is mounted on the side frame 140 through the screwing of the nut 308.

The effect of the means for adjusting the initial tension force including the above structure will be now explained about.

Firstly, like the first embodiment, the pin is penetrated into the opening of one of the wound portions 204 of the oblique monolithic strip 102 and the opening portion of the base bracket 34 of the recliner, and then, the one end of the oblique monolithic strip 102 is fixed by screwing the nut.

Then, the sloped disk 302 is fitted into the opening of the other of the wound portions 204 of the oblique monolithic strip 102, while the guide block 304 is fitted into the elongated groove 324 of the sloped disk 302, whereby the other end of the oblique monolithic strip 102 is fixed by making the pin 306 penetrate into the opening 337 of the side frame 140, the elongated opening 318 of the sloped disk 302 and the opening 334 of the guide block 304, and screwing the nut 308 via the washer 336 from the inside of the side frame 140.

More specifically, the elongated opening 318 of the sloped disk 302 is adjusted so as to be oriented in the direction in which the oblique monolithic strip 102 extends by rotating the sloped disk 302 fitted into the opening 309 of the wound portion 204. In such a case, since the direction in which the elongated grove 324 communicated with the elongated opening 318 is set to be along the direction in which the elongated opening 318 extends, as shown in FIG. 21, the inclined bottom surface 326 of the elongated groove 324 is arranged so as to approach the outer side in the widthwise direction of the vehicle, that is, the guide block 304, as it moves forward of the vehicle.

Then, by screwing the nut 308, the pin 306 is fixed to the side frame 140 in a non-rotatable manner while at the same time the guide block 304 is fixed to the pin 306 in a non-rotatable manner, so that the nut 308 is moved toward the side frame 140 as shown by an arrow, whereby the guide block 304 is also moved toward the side frame 140 via the washer 336, and as a result, the other of the wound portions 204 of the oblique monolithic strip 102 is pressed against the outer side surface 209 of the side frame 140 through the sloped disk 302, and thus, the lower end 210 of the oblique monolithic strip 102 can be mounted to be fixed to the side frame 140.

Figure 22:
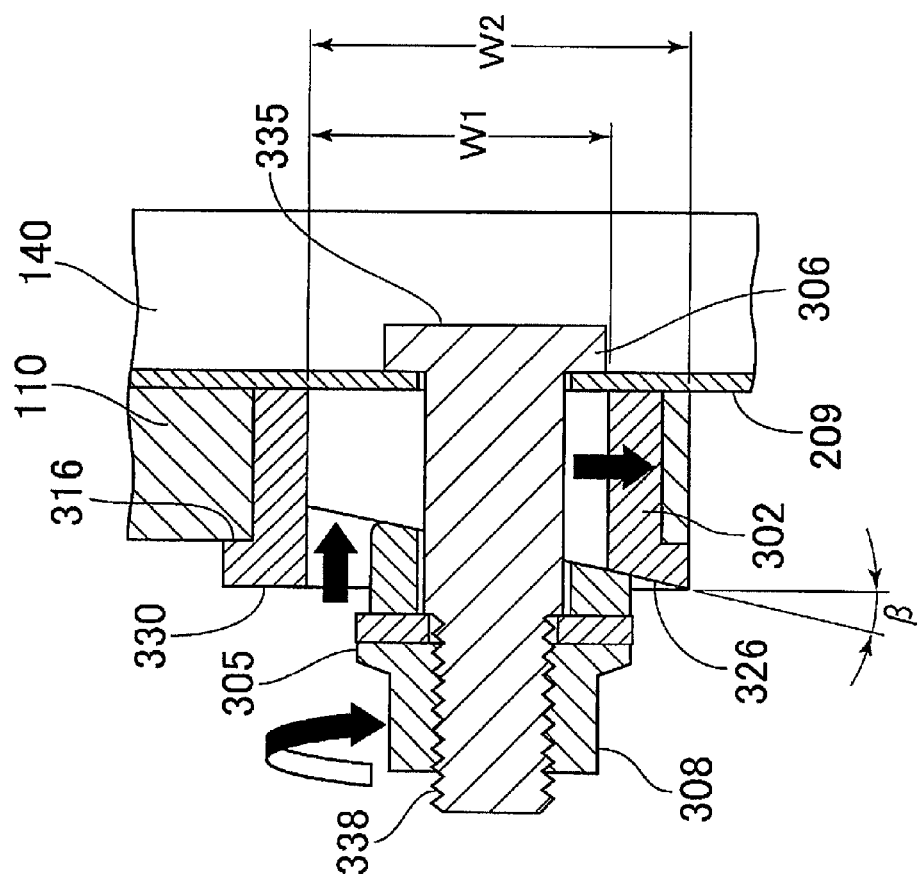
FIG. 22 is a mechanism in which a tension force is generated on the other of the wound portions of the oblique monolithic strip of the second embodiment of the present invention.

Further, as shown in FIG. 22, since the inclined surface 307 of the guide block 304 and each of the opposed guiding side surfaces 333 abut against the inclined bottom surface 326 of the sloped disk 302 and the corresponding guided side surface 332, respectively, the sloped disk 302, and thus, the other end of the oblique monolithic strip 102 is pushed out in the forward direction of the vehicle, or the direction in which the tension force is applied to the oblique monolithic strip 102 when the guide block 304 is moved toward the side frame 140.

More specifically, the component in the forward direction of the vehicle is inevitably generated on a normal drag against the inclined bottom surface 326 of the inclined surface 307 due to the orientation of the inclination of the inclined bottom surface 326 of the sloped disk 302. Because of such a component in the forward direction of the vehicle, the sloped disk 302, and thus, the wound portions 204 are pushed forward of the vehicle by the fact that each of the opposed guided side surfaces 332 of the sloped disk 302 is guided along the corresponding guiding side surface 333 of the guide block 304 without causing a deviation in the direction perpendicular to the one in which the oblique monolithic strip 102 extends, whereby the tension force is applied to the oblique monolithic strip 102.

In this case, the amount of the movement of the sloped disk 302 in the forward direction of the vehicle, and thus, the tension force which is generated on the oblique monolithic strip 102 can be adjusted by adjusting the amount of the screwing of the nut 308. Since an adjustment range of the tension force is determined by the range in which the sloped disk 302 is moved in the forward direction of the vehicle, if such an adjustment range is desired to be broadened, the opening portion 337 of the side frame 140 may be arranged so as to make the length of oblique monolithic strip 102 natural when it is mounted to be fixed on the side frame 140 so that the longitudinal length of each of the elongated opening 318 and the elongated groove 324 is secured as long as possible, and thus, the size of the wound portions 204 is increased as much as possible. The maximum initial tension force is determined by the position where the pin 306 penetrating into the elongated opening 318 engages the peripheral side surface of the elongated opening 318 at the rear side of the vehicle, or the position where the guide block 304 fitted into the elongated groove 324 engages the peripheral side surface of the elongated groove 324 at the rear side of the vehicle.

As described above, the oblique monolithic strip 102 can be efficiently mounted on the side frame 140 of the seat for the vehicle simply by rotating the nut 308 in the screwing direction. Further, the initial tension force generated on the oblique monolithic strip 102 can be readily and minutely adjusted to a desired value by adjusting an amount of the screwing of the nut 308.

In particular, when the nut 308 is screwed, the oblique monolithic strip 102 can be instantly mounted by using an impacter, for instance, in addition, the initial tension force generated on the oblique monolithic strip 102 can be readily adjusted to a desired value by adjusting a rotating torque of the impacter.

As described above, the preferred embodiments of the present invention were described in detail, however, it is evident that those skilled in the art could modify or change the embodiments in various manners without departing from the scope of the present invention.

For instance, in the first embodiment, with respect to the seat cushion frame structure 104, the oblique monolithic strip is provided on each side portion of the pair of the side frames 140A,B, however, it may be provided on only ore side portion of the pair of the side frames 140A,B.

In addition, in the first embodiment, the seat including the oblique monolithic strip is applied to the automobile, however, it may be applied to general transportation vehicles such as railway vehicles, ships, airplanes. Further, in a case where the seat including the oblique monolithic strip is applied to the automobile, it may be applied to either a rear seat or a front seat, or to both seats. Still further, in the first embodiment, the oblique monolithic strip is only provided on the side frame 140 of the seat cushion frame structure 104, however, it may be provided on the side frame of the seat back frame structure in an auxiliary manner.

What is claimed is:

1. A seat cushion frame structure of a seat for a vehicle comprises a seat cushion frame structure a rear end of which is connected to a lower end of a seat back frame structure in such a way that the seat back frame structure can be inclined relative to the seat cushion frame structure, said seat cushion frame structure includes a pair of side frames spaced apart from each other in the widthwise direction of the vehicle each of which extends in a longitudinal direction of the vehicle, and an oblique monolithic strip made of high tension steel on at least one of said pair of side frames, an upper end of which is fixed to a side portion of said at least one of pair of side frames and a lower end of which is fixed to said seat cushion frame structure at a position forward of said upper end, said oblique monolithic strip includes a characteristic such that when a load toward a rear side of the vehicle is loaded on said seat cushion frame structure, it has a tension force exerted on said seat cushion frame structure so as to alleviate a moment acting on said seat cushion frame structure caused by said load, said oblique monolithic strip being arranged in such a way that one of its strip surfaces is oriented to face upward, its cross section is a rectangle long in a lateral direction, and said oblique monolithic strip includes at each of its upper and lower ends a wound portion which is wound in a loop manner in such a way that said one strip surface is oriented to be inward, whereby said oblique monolithic strip is fixed on said seat cushion frame structure via said wound portions with its side surface facing said side frame and said oblique monolithic strip includes portions of its strip surfaces that overlap with each other and form an overlapping portion near said wound portions of the respective upper and lower ends of the oblique monolithic strip and the portions of the strip surface that overlap are fixed to each other.

2. The seat cushion frame structure according to claim 1, wherein said wound portion at said upper end of said oblique monolithic strip is formed on the same side as that on which said wound portion at said lower end of said oblique monolithic strip is formed by inwardly winding the same strip surface.

3. The seat cushion frame structure according to claim 1, wherein said upper and lower ends of said oblique monolithic strip are fixed on an outer side surface of said side frame of said seat cushion frame structure in such a way that said oblique monolithic strip can rotate about the widthwise direction of the vehicle.

4. The seat cushion frame structure according to claim 1, wherein said oblique monolithic strip further includes a means for adjusting an initial, tension force generated thereon.

5. The seat cushion frame structure according to claim 4, wherein said initial tension force generating means includes a sloped disk which is rotatably fixed to be supported by either of said wound portions and includes an elongated opening, a guide block which fits with said sloped disk in a non-rotatable manner and includes an opening, a pin including a head portion which can be fixed on said side frame in a non-rotatable manner and a shank portion which includes at its tip portion a threaded portion and a sufficient length as to make said opening of said side frame, said elongated opening of said sloped disk, and said opening of said guide block penetrate thereinto, and a nut which can be threaded into said pin via a washer, said sloped disk includes at its one surface an elongated groove into which said guide block can fit, said elongated groove is so provided as to extend in the same direction as the longitudinal direction of said elongated opening and includes an inclined bottom surface which is inclined at a predetermined angle, said guide block is fixed on said pin in a non-rotatable manner and includes an abutting surface which can abut against an end face of said nut via said washer, and an inclined surface at the side opposite of the abutting surface which can abut against the inclined bottom surface while said abutting surface is kept abutting against the end face of said nut, said initial tension force adjusting means is provided on either of said upper and lower ends of said oblique monolithic strip to serve as a mechanism by which said oblique monolithic strip is mounted on said side frame.

6. The seat cushion frame structure according to claim 5, wherein said shank portion includes at its root portion a non-circular cross section with plane sections opposed to each other, each of said opening portion of said side frame and said opening portion of said guide block is shaped in such a way that said non-circular cross section snugly fits thereinto, said elongated opening portion of said sloped disk includes a longitudinal length sufficient for said non-circular cross section of said shank portion to move in the longitudinal direction when said non-circular cross section of said shank portion fits into said elongated opening.

7. The seat cushion frame structure according to claim 6, wherein said elongated groove includes guided side surfaces opposed to each other each of which extends from the corresponding one of the opposed edge portions extending in the longitudinal direction of said inclined bottom surface to said one surface, said guide block includes guiding side surfaces opposed to each other, whereby said guided side surfaces of said sloped disk are guided along said guiding side surfaces of said guide block by said guide block being moved toward said side frame.

8. The seat cushion frame structure according to claim 7, wherein each of said openings of said wound portions is shaped to be circular, said sloped disk includes a cylindrical body section, an outer peripheral surface of which can fit into the circular opening of said wound portion, and a circular protruding flange which is formed to be coaxial with said cylindrical body section, a shoulder section which can abut against the side surface of said oblique monolithic strip is formed between said circular protruding flange and said cylindrical body section, said elongated groove extending through an outer edge of said circular protruding flange.

9. The seat cushion frame structure according to claim 8, wherein the width of said elongated opening is set to be narrower than that of said elongated groove, said elongated opening of said sloped disk is provided on said inclined bottom surface of said elongated groove.

10. The seat cushion frame structure according to claim 1, wherein a recliner is provided between said seat cushion frame structure and said seat back frame structure so as to allow the seat back to incline relative to the seat cushion, said recliner comprises a base member fixed to said seat cushion, a rotational arm rotatably supported by said base member and fixed to the seat back, a sliding lock member which is interposed between said base member and said rotational arm and is guided by a concave side wall formed on said base member and forms outer teeth at its tip portion, a rotational cam which moves said sliding lock member between a locking position where said sliding lock member mates with inner teeth formed on said rotational arm and a lock releasing position where said sliding lock member disengages the inner teeth, and an actuation lever which rotates said rotational cam, said base member is a circular plate provided on a central portion of said base member and including a bracket portion with a perforated hole into which a pivot shaft of said actuation lever penetrates, said seat cushion frame structure further includes a base bracket at a side opposite to said rotational arm, said base bracket is provided with a mounting portion for fixing said base bracket to the seat cushion, the upper end of said oblique monolithic strip is fixed on said mounting portion.

11. The seat cushion frame structure according to claim 10, wherein said tension force adjusting means includes a means for adjusting a distance between said mounting portion of said base bracket on which said upper end of the oblique monolithic strip is mounted and a mounting portion of said side frame on which said lower end of the oblique monolithic strip is mounted, and a predetermined deflection in the direction perpendicular to the longitudinal direction thereof when it is mounted on said seat cushion frame structure, whereby the tension force is generated on the oblique monolithic strip by decreasing said deflection using said distance adjusting means.

12. The seat cushion frame structure according to claim 11, wherein said base bracket is mounted on said side frame in such a way that said mounting portion of said base bracket can be rotated between a position where said oblique monolithic strip can be mounted on said seat cushion frame structure and a position where the initial tension force is generated on the oblique monolithic strip by pressing the top portion of the seat back frame structure in the rearward direction of the vehicle while said cam remains at said engaging position.

13. The seat cushion frame structure according to claim 12, wherein said base bracket includes, below a penetrating hole into which the pivot shaft of said actuating lever penetrates, a first mounting hole and a second mounting hole between said first mounting hole and said mounting portion of said oblique monolithic strip, said base bracket is fixed on said side frame by making bolts penetrate into said first and second mounting holes, respectively, said second mounting hole is formed to be an elongated hole by which said mounting portion of said base bracket can rotate between said mounting position and said initial tension force generating position.

14. The seat cushion frame structure according to claim 1, wherein said oblique monolithic strip is provided on the side portion of each of said pair of side frames.

15. The seat cushion frame structure according to claim 1, wherein each of the portions of said oblique monolithic strip constituting said overlapping portion includes an elongated opening in its longitudinal direction, a bolt including a shank portion which can penetrate into said elongated opening and a nut which can thread into said bolt are provided, whereby said portions of said oblique monolithic strip are fixed to each other by screwing said nut on the bolt.

16. The seat cushion frame structure according to claim 1, wherein said portions forming said overlapping portion are fixed to each other by spot welding or projection welding.

17. A seat for a vehicle comprising a pad to cover the entirety or said seat cushion frame structure according to claim 1, and a skin sheet in a bag form to cover the entirety of said set cushion frame structure and said pad.

* * * * *